US012795141B2

(12) United States Patent
Sánchez De La Fuente et al.

(10) Patent No.: US 12,795,141 B2
(45) Date of Patent: *Nov. 10, 2026

(54) VIDEO DATA STREAM, VIDEO ENCODER, APPARATUS AND METHODS FOR A HYPOTHETICAL REFERENCE DECODER AND FOR OUTPUT LAYER SETS

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 52 days.

This patent is subject to a terminal disclaimer.

(21) Appl. No.: 18/760,591

(22) Filed: Jul. 1, 2024

(65) Prior Publication Data

US 2024/0357148 A1 Oct. 24, 2024

Related U.S. Application Data

(63) Continuation of application No. 17/787,234, filed as application No. PCT/EP2020/087023 on Dec. 18, 2020, now Pat. No. 12,063,381.

(30) Foreign Application Priority Data

Dec. 20, 2019 (EP) .................................... 19219037

(51) Int. Cl.
*H04N 19/46* (2014.01)
*H04N 19/423* (2014.01)

(52) U.S. Cl.
CPC ........... *H04N 19/46* (2014.11); *H04N 19/423* (2014.11)

(58) Field of Classification Search
CPC ................. H04N 19/46; H04N 19/423; H04N 21/440281; H04N 21/4516; G11B 27/031; G11B 27/005
See application file for complete search history.

(56) References Cited

U.S. PATENT DOCUMENTS 12,063,381 B2 * 8/2024 Sánchez De La Fuente ............... H04N 21/440281
2010/0074340 A1 3/2010 Luo et al.
(Continued)

FOREIGN PATENT DOCUMENTS

EP 3 382 706 10/2018

OTHER PUBLICATIONS

Sanchez, et al., "AHG17: On HRD for VVC: Splicing, Open GOP and DRAP support", Joint Video Experts Team (JVET), of ITU-T SG 16 WP 3 and ISO/IEC JTC 1/SC 29/WG 11, JVET-P0446-v2, Geneva, CH, Oct. 1-11, 2019, 11 pages.
(Continued)

*Primary Examiner* — Joseph W Becker
(74) *Attorney, Agent, or Firm* — Sage Patent Group

(57) ABSTRACT

An apparatus for receiving a video data stream as an input bitstream is provided. The video data stream has a video encoded thereinto, wherein, for a playback speed modification factor (Nx), the apparatus is to determine a decoding capability requirement depending on a decoding capability requirement limit, wherein the playback speed modification
(Continued)

factor (Nx) is a forward playback speed modification factor or is a backward playback speed modification factor.

26 Claims, 8 Drawing Sheets

(56) References Cited

U.S. PATENT DOCUMENTS

| | | | |
|---|---|---|---|
| 2014/0355692 | A1 | 12/2014 | Ramasubramonian |
| 2019/0281314 | A1 | 9/2019 | Tanaka et al. |
| 2023/0095686 | A1 | 3/2023 | Sánchez De La Fuente et al. |

OTHER PUBLICATIONS

Bross et al., "Versatile Video Coding (Draft 5)," Document: JVET-N1001-v10, Joint Video Experts Team (JVET) of ITU-T SG 16 WP 3 and 1S0/IEC JTC 1/SC 29/WG 11, 14th Meeting: Geneva, CH, Mar. 19-27, 2019, 4 pp.

Sanchez, Yago et al., "AHG17: On HRD for splicing," Document: JVET-O0496, Joint Video Experts Team (JVET) of ITU-T SG 16 WP 3 and 1S0/IEC JTC 1/SC 29/WG 11, 15th Meeting: Gothenburg, SE, Jul. 3-12, 2019, 7 pp.

Bross et al., "Versatile Video Coding (Draft 7)," Document: JVET-P2001-vE, Joint Video Experts Team (JVET) of ITU-T SG 16 WP 3 and 1S0/IEC JTC 1/SC 29/WG 11, 16th Meeting: Geneva, CH, Oct. 1-11, 2019, 488 pp.

Deshpande, Sachin et al., "An Improved Hypothetical Reference Decoder for HEVC," Visual Information Processing and Communication IV, edited by Amir Said, Onur G. Guleryuz, Robert L. Stevenson, Proc. of SPIE-IS&T Electronic Imaging, SPIE vol. 8666, 866608 © 2013 SPIE-IS&T CCC code: 0277-786X/13/$18 • doi: 10.1117/12.2009907, 9 pp.

International Search Report for PCT/EP2020/087023 dated May 14, 2021, 6 pages.

Written Opinion of the ISA for PCT/EP2020/087023 dated May 14, 2021, 11 pages.

ITU-T, "High efficiency video coding Series H: Audiovisual and Multimedia Systems Infrastructure of audiovisual services—Coding of moving video", http://www.itu.int/rec/T-REC-H.265-201304-S/en, Apr. 13, 2013, H.265 international standard document, 317 pp.

ITU-T, "High efficiency video coding Series H: Audiovisual and Multimedia Systems Infrastructure of audiovisual services—Coding of moving video", Oct. 2014, 540 pp.

Taiwan Office Action dated Apr. 6, 2022 issued in Taiwanese Patent Application No. 109144863 and English translation, 22 pp.

* cited by examiner

VIDEO DATA STREAM, VIDEO ENCODER, APPARATUS AND METHODS FOR A HYPOTHETICAL REFERENCE DECODER AND FOR OUTPUT LAYER SETS

CROSS-REFERENCE TO RELATED APPLICATION(S)

This application is a continuation of U.S. patent application Ser. No. 17/787,234, filed Jun. 17, 2022, pending, which is the U.S. national phase of PCT International Patent Application No. PCT/EP2020/087023, filed Dec. 18, 2020, which designated the U.S. and claims priority to European Patent Application No. 19219037.9, filed Dec. 20, 2019, the entire contents of each of which are hereby incorporated by reference in this application.

DESCRIPTION

The present invention relates to video encoding and video decoding and, in particular, to a video encoder, to a video decoder, to methods for encoding and decoding and to a video data stream for realizing advanced video coding concepts.

H.265/HEVC (HEVC=High Efficiency Video Coding) is a video codec which already provides tools for elevating or even enabling parallel processing at an encoder and/or at a decoder. For example, HEVC supports a sub-division of pictures into an array of tiles which are encoded independently from each other. Another concept supported by HEVC pertains to WPP, according to which CTU-rows or CTU-lines of the pictures may be processed in parallel from left to right, e.g. in stripes, provided that some minimum CTU offset is obeyed in the processing of consecutive CTU lines (CTU=coding tree unit). It would be favorable, however, to have a video codec at hand which supports parallel processing capabilities of video encoders and/or video decoders even more efficiently.

Typically, in video coding, a coding process of picture samples requires smaller partitions, where samples are divided into some rectangular areas for joint processing such as prediction or transform coding. Therefore, a picture is partitioned into blocks of a particular size that is constant during encoding of the video sequence. In H.264/AVC standard fixed-size blocks of 16×16 samples, so called macroblocks, are used (AVC=Advanced Video Coding).

In the state-of-the-art HEVC standard (see [1]), there are Coded Tree Blocks (CTB) or Coding Tree Units (CTU) of a maximum size of 64×64 samples. In the further description of HEVC, for such a kind of blocks, the more common term CTU is used.

CTUs are processed in raster scan order, starting with the top-left CTU, processing CTUs in the picture line-wise, down to the bottom-right CTU.

The coded CTU data is organized into a kind of container called slice. Originally, in former video coding standards, slice means a segment comprising one or more consecutive CTUs of a picture. Slices are employed for a segmentation of coded data. From another point of view, the complete picture can also be defined as one big segment and hence, historically, the term slice is still applied. Besides the coded picture samples, slices also comprise additional information related to the coding process of the slice itself which is placed into a so-called slice header.

According to the state-of-the-art, a VCL (video coding layer) also comprises techniques for fragmentation and spatial partitioning. Such partitioning may, e.g., be applied in video coding for various reasons, among which are processing load-balancing in parallelization, CTU size matching in network transmission, error-mitigation etc.

A bitstream as specified in video coding standards has HRD conformance associated information. This conformance consists of a hypothetical reference decoder (HRD) including a buffer model that assumes that NAL units enter a Coded Picture Buffer (CPB) before the decoder and are removed therefrom at a particular time ensuring that the CPB size is not exceeded (buffer overrun) or that the NAL units do not arrive later than when they need to be removed (buffer underrun). Further, the model consists of a Decoded Picture Buffer (DPB) out of which decoded pictures are output when they are no longer needed for prediction and whose size is likewise constrained in many implementations. The timing information for the HRD is conveyed in the bitstream through so-called supplemental enhancement information (SEI) messages, in particular, the Buffering Period (BP) SEI message that defines certain timing information for a Buffering Period (multiple access units or AUs), Picture Timing (PT) SEI message that conveys timing information for a single associated AU, and the Decoding Unit Information (DUI) SEI message that conveys timing information for an associated subset of an AU, namely a decoding unit or DU.

The object of the present invention is to provide improved concepts for video encoding and video decoding.

The object of the present invention is solved by the subject-matter of the independent claims.

Preferred embodiments are provided in the dependent claims.

According to an embodiment, an apparatus for receiving a video data stream as an input bitstream, wherein the video data stream has a video encoded thereinto, is provided. For a playback speed modification factor (Nx), the apparatus is to determine a decoding capability requirement depending on a decoding capability requirement limit. The playback speed modification factor (Nx) is a forward playback speed modification factor or is a backward playback speed modification factor.

Moreover, according to an embodiment, a video data stream having a video encoded thereinto is provided. The video data stream comprises information on a sample rate limit, and/or the video data stream comprises information on a bitrate limit.

Furthermore, according to an embodiment, a video encoder for encoding a video into a video data stream, such that the video data stream has the video encoded thereinto, is provided. The video encoder is to generate the video data stream such that the video data stream comprises information on a sample rate limit, and/or the video encoder is to generate the video data stream such that the video data stream comprises information on a bitrate limit.

Moreover, according to an embodiment, a method for receiving a video data stream as an input bitstream, wherein video data stream has a video encoded thereinto, is provided. For a playback speed modification factor (Nx), the method comprises determining a decoding capability requirement depending on a decoding capability requirement limit. The playback speed modification factor (Nx) is a forward playback speed modification factor or is a backward playback speed modification factor.

Furthermore, according to an embodiment, a method for encoding a video into a video data stream, such that the video data stream has the video encoded thereinto, is provided. The method comprises generating the video data stream such that the video data stream comprises information on a sample rate limit, and/or the method comprises generating the video data stream such that the video data stream comprises information on a bitrate limit.

Moreover, computer programs for implementing one of the above-described methods when being executed on a computer or signal processor are provided.

Furthermore, according to an embodiment, a video data stream having a video encoded thereinto is provided. The video data stream comprises a plurality of access units, wherein a group of access units of the video data stream comprises the plurality of access units. Moreover, the video data stream comprises an indication for each access unit of a subset of access units indicating that a seamless splicing point exists after said access unit. The subset of access units is a proper subset of the group of access units of the video data stream.

Moreover, according to an embodiment, a video encoder for encoding a video into a video data stream, such that the video data stream has the video encoded thereinto, is provided. The video encoder is to generate the video data stream such that the video data stream comprises a plurality of access units, wherein a group of access units of the video data stream comprises the plurality of access units. Furthermore, the video encoder is to generate the video data stream such that the video data stream comprises an indication for each access unit of a subset of access units indicating that a seamless splicing point exists after said access unit. Moreover, the video encoder is to generate the video data stream such that the subset of access units is a proper subset of the group of access units of the video data stream.

Furthermore, according to an embodiment, an apparatus for receiving a video data stream as an input bitstream, wherein the video data stream has a video encoded thereinto, is provided. The apparatus is to process the video data stream. The video data stream comprises a plurality of access units, wherein a group of access units of the video data stream comprises the plurality of access units. Moreover, the video data stream comprises an indication for each access unit of a subset of access units indicating that a seamless splicing point exists after said access unit. The subset of access units is a proper subset of the group of access units of the video data stream. The apparatus is to process the indication.

Moreover, according to an embodiment, a method for encoding a video into a video data stream, such that the video data stream has the video encoded thereinto, is provided. The method comprises generating the video data stream such that the video data stream comprises a plurality of access units, wherein a group of access units of the video data stream comprises the plurality of access units. Furthermore, the method comprises generating the video data stream such that the video data stream comprises an indication for each access unit of a subset of access units indicating that a seamless splicing point exists after said access unit. Moreover, the method comprises generating the video data stream such that the subset of access units is a proper subset of the group of access units of the video data stream.

Furthermore, according to an embodiment, a method for receiving a video data stream as an input bitstream, wherein the video data stream has a video encoded thereinto, is provided. The method comprises processing the video data stream. The video data stream comprises a plurality of access units, wherein a group of access units of the video data stream comprises the plurality of access units. Moreover, the video data stream comprises an indication for each access unit of a subset of access units indicating that a seamless splicing point exists after said access unit. The subset of access units is a proper subset of the group of access units of the video data stream. The method comprises processing the indication.

Moreover, computer programs for implementing one of the above-described methods when being executed on a computer or signal processor are provided.

Furthermore, according to an embodiment, an apparatus for receiving a video data stream as an input bitstream, wherein video data stream has a video encoded thereinto, is provided. The apparatus is to process the input bitstream depending on an output layer set to obtain a sub-bitstream. If the output layer set does not comprise a predefined layer of a plurality of layers that are present in the video data stream, the apparatus is to remove at least one non-scalable nested supplemental enhancement information message which is assigned with the predefined layer. If the output layer set comprises the predefined layer, the apparatus is configured to not remove any non-scalable nested supplemental enhancement information message which is assigned with the predefined layer.

Moreover, according to an embodiment, a video data stream having a video encoded thereinto, is provided. The video data stream comprises a video parameter set. The video parameter set comprises a plurality of output layer sets. If none of the plurality of output layer sets comprises all layers of a plurality of layers that are present in the video data stream, the video data stream does not comprise any non-scalable nested supplemental enhancement information message for a hypothetical reference decoder.

Furthermore, according to an embodiment, a video encoder for encoding a video into a video data stream, such that the video data stream has the video encoded thereinto, is provided. The video encoder is to generate the video data stream such that the video data stream comprises a video parameter set. Moreover, the video encoder is to generate the video data stream such that the video parameter set comprises a plurality of output layer sets. If none of the plurality of output layer sets comprises all layers of a plurality of layers that are present in the video data stream, the video encoder is to generate the video data stream such that the video data stream does not comprise any non-scalable nested supplemental enhancement information message for a hypothetical reference decoder.

Moreover, according to an embodiment, a method for receiving a video data stream as an input bitstream, wherein video data stream has a video encoded thereinto, is provided. The method comprises processing the input bitstream depending on an output layer set to obtain a sub-bitstream. If the output layer set does not comprise a predefined layer (vps_layer_id [0]) of a plurality of layers that are present in the video data stream, the method comprises removing at least one non-scalable nested supplemental enhancement information message which is assigned with the predefined layer (vps_layer_id [0]). If the output layer set comprises the predefined layer (vps_layer_id [0]), the method comprises not removing any non-scalable nested supplemental enhancement information message which is assigned with the predefined layer (vps_layer_id [0]).

Furthermore, according to an embodiment, a method for encoding a video into a video data stream, such that the video data stream has the video encoded thereinto, is provided. The method comprises generating the video data stream such that the video data stream comprises a video parameter set. Moreover, the method comprises generating the video data stream such that the video parameter set comprises a plurality of output layer sets. If none of the plurality of output layer sets comprises all layers of a plurality of layers that are present in the video data stream, the method comprises generating the video data stream such that the video data stream does not comprise any non-scalable nested supplemental enhancement information message for a hypothetical reference decoder.

Furthermore, according to an embodiment, an apparatus for receiving a video data stream as an input bitstream, wherein video data stream has a video encoded thereinto, is provided. The video data stream comprises initial profile tier level information. Moreover, the video data stream comprises a first group of two or more layers. The apparatus is to process the input bitstream depending on an output layer set of a plurality of output layer sets to generate an output bitstream by removing at least one layer from the first group of two or more layers to obtain a second group of one or more layers, such that the output bitstream comprises the second group of one or more layers, but not the at least one layer that has been removed from the first group. Furthermore, the apparatus is to remove those portions of the initial profile tier level information from the initial profile tier level information that is not associated with at least one layer of the second group of one or more layers.

Furthermore, according to an embodiment, an apparatus for receiving a video data stream as an input bitstream, wherein video data stream has a video encoded thereinto, is provided. The video data stream comprises scalable nesting supplemental enhancement information comprising decoding parameter set information for each output layer set of a plurality of output layer sets. The apparatus is to process the input bitstream depending on an output layer set of the plurality of output layer sets to obtain an output bitstream, such that the output bitstream comprises the decoding parameter set information for said output layer set, and such that the output bitstream does not comprise the decoding parameter set information for any other output layer set of the plurality of output layer sets.

Moreover, according to an embodiment, a video data stream having a video encoded thereinto, is provided. The video data stream comprises scalable nesting supplemental enhancement information comprising decoding parameter set information for each output layer set of a plurality of output layer sets.

Furthermore, according to an embodiment, a video encoder for encoding a video into a video data stream, such that the video data stream has the video encoded thereinto, is provided. The video encoder is to generate the video data stream such that the video data stream comprises scalable nesting supplemental enhancement information comprising decoding parameter set information for each output layer set of a plurality of output layer sets.

Moreover, according to an embodiment, a video data stream having a video encoded thereinto, is provided. The video data stream comprises an indication of a plurality of operation points. Moreover, the video data stream comprises a first mapping for each operation point of the plurality of operation points which assigns one or more profile tier levels of a plurality of profile tier levels to said operation point. Furthermore, the video data stream comprises a plurality of second mappings, wherein each of the plurality of mappings assigns one of the plurality of operation points to an output level set of a plurality of output level sets.

Furthermore, according to an embodiment, a video encoder for encoding a video into a video data stream, such that the video data stream has the video encoded thereinto, is provided. The video encoder is to generate the video data stream such that the video data stream comprises an indication of a plurality of operation points. Moreover, the video encoder is to generate the video data stream such that the video data stream comprises a first mapping for each operation point of the plurality of operation points which assigns one or more profile tier levels of a plurality of profile tier levels to said operation point. Furthermore, the video encoder is to generate the video data stream such that the video data stream comprises a plurality of second mappings, wherein each of the plurality of mappings assigns one of the plurality of operation points to an output level set of a plurality of output level sets.

Moreover, according to an embodiment, an apparatus for receiving a video data stream as an input bitstream, wherein video data stream has a video encoded thereinto, is provided. The video data stream comprises an indication of a plurality of operation points. Furthermore, the video data stream comprises a first mapping for each operation point of the plurality of operation points which maps one or more profile tier levels of a plurality of profile tier levels to said operation point. Moreover, the video data stream comprises a plurality of second mappings, wherein each of the plurality of mappings maps one of the plurality of operation points to an output level set of a plurality of output level sets. The apparatus is to process the input bitstream depending on an output layer set of a plurality of output layer sets and depending on at least one of the second mappings, which maps one of the plurality of operation points said an output level set, to generate an output bitstream.

Furthermore, according to an embodiment, a method for receiving a video data stream as an input bitstream, wherein video data stream has a video encoded thereinto, is provided. The video data stream comprises initial profile tier level information. Moreover, the video data stream comprises a first group of two or more layers. The method comprises processing the input bitstream depending on an output layer set of a plurality of output layer sets to generate an output bitstream by removing at least one layer from the first group of two or more layers to obtain a second group of one or more layers, such that the output bitstream comprises the second group of one or more layers, but not the at least one layer that has been removed from the first group. Furthermore, the method comprises removing those portions of the initial profile tier level information from the initial profile tier level information that is not associated with at least one layer of the second group of one or more layers.

Moreover, according to an embodiment, a method for receiving a video data stream as an input bitstream, wherein video data stream has a video encoded thereinto, is provided. The video data stream comprises scalable nesting supplemental enhancement information comprising decoding parameter set information for each output layer set of a plurality of output layer sets. The method comprises processing the input bitstream depending on an output layer set of the plurality of output layer sets to obtain an output bitstream, such that the output bitstream comprises the decoding parameter set information for said output layer set, and such that the output bitstream does not comprise the decoding parameter set information for any other output layer set of the plurality of output layer sets.

Furthermore, according to an embodiment, a method for encoding a video into a video data stream, such that the video data stream has the video encoded thereinto, is provided. The method comprises generating the video data stream such that the video data stream comprises scalable nesting supplemental enhancement information comprising decoding parameter set information for each output layer set of a plurality of output layer sets.

Moreover, according to an embodiment, a method for encoding a video into a video data stream, such that the video data stream has the video encoded thereinto, is provided. The method comprises generating the video data stream such that the video data stream comprises an indication of a plurality of operation points. Moreover, the method comprises generating the video data stream such that the video data stream comprises a first mapping for each operation point of the plurality of operation points which assigns one or more profile tier levels of a plurality of profile tier levels to said operation point. Furthermore, the method comprises generating the video data stream such that the video data stream comprises a plurality of second mappings, wherein each of the plurality of mappings assigns one of the plurality of operation points to an output level set of a plurality of output level sets.

Furthermore, according to an embodiment, a method for receiving a video data stream as an input bitstream, wherein video data stream has a video encoded thereinto, is provided. The video data stream comprises an indication of a plurality of operation points. Moreover, the video data stream comprises a first mapping for each operation point of the plurality of operation points which maps one or more profile tier levels of a plurality of profile tier levels to said operation point. Furthermore, the video data stream comprises a plurality of second mappings, wherein each of the plurality of mappings maps one of the plurality of operation points to an output level set of a plurality of output level sets. The method comprises processing the input bitstream depending on an output layer set of a plurality of output layer sets and depending on at least one of the second mappings, which maps one of the plurality of operation points said an output level set, to generate an output bitstream.

Moreover, computer programs for implementing one of the above-described methods when being executed on a computer or signal processor are provided.

According to an embodiment, a video data stream having a video encoded thereinto, is provided. The video data stream comprises a sequence parameter set and a decoding parameter set. The sequence parameter set comprises a first indication value that indicates, according to the information stored in the sequence parameter set, a maximum number of sublayers or the maximum number of sublayers minus a constant value. The decoding parameter set comprises a second indication value that indicates, according to the information stored in the decoding parameter set, the maximum number of sublayers or the maximum number of sublayers minus the constant value. The first indication value is smaller than or equal to the second indication value.

Moreover, according to an embodiment, a video encoder for encoding a video into a video data stream, such that the video data stream has the video encoded thereinto, is provided. The video encoder is to generate the video data stream such that the video data stream comprises a sequence parameter set and a decoding parameter set. The video encoder is to generate the video data stream such that the sequence parameter set comprises a first indication value that indicates, according to the information stored in the sequence parameter set, a maximum number of sublayers or the maximum number of sublayers minus a constant value. Moreover, the video encoder is to generate the video data stream such that the decoding parameter set comprises a second indication value that indicates, according to the information stored in the decoding parameter set, the maximum number of sublayers or the maximum number of sublayers minus the constant value. Furthermore, the video encoder is to generate the video data stream such that the first indication value is smaller than or equal to the second indication value.

Furthermore, according to an embodiment, a video encoder for encoding a video into a video data stream, such that the video data stream has the video encoded thereinto, is provided. The video encoder is to generate the video data stream such that the video data stream comprises a sequence parameter set and a decoding parameter set. Moreover, the video encoder is to generate the video data stream such that the sequence parameter set comprises a first indication value that indicates, according to the information stored in the sequence parameter set, a maximum number of sublayers or the maximum number of sublayers minus a constant value. Furthermore, the video encoder is to generate the video data stream such that the decoding parameter set comprises a second indication value that indicates, according to the information stored in the decoding parameter set, the maximum number of sublayers or the maximum number of sublayers minus the constant value. The second indication value of the decoding parameter set is an upper bound having precedence over the first indication value of the sequence parameter set.

Furthermore, according to an embodiment, an apparatus for receiving a video data stream as an input bitstream, wherein video data stream has a video encoded thereinto, is provided. The video data stream comprises a sequence parameter set and a decoding parameter set. The sequence parameter set comprises a first indication value that indicates, according to the information stored in the sequence parameter set, a maximum number of sublayers or the maximum number of sublayers minus a constant value. The decoding parameter set comprises a second indication value that indicates, according to the information stored in the decoding parameter set, the maximum number of sublayers or the maximum number of sublayers minus the constant value. If the first indication value is greater than the second indication value, the apparatus is to process the input bitstream to generate an output bitstream such that the output bitstream comprises the second indication value as an indication on a maximum number of sublayers or on a maximum number of sublayers minus the constant value Moreover, according to an embodiment, a method for encoding a video into a video data stream, such that the video data stream has the video encoded thereinto, is provided. The method comprises generating the video data stream such that the video data stream comprises a sequence parameter set and a decoding parameter set. Furthermore, the method comprises generating the video data stream such that the sequence parameter set comprises a first indication value that indicates, according to the information stored in the sequence parameter set, a maximum number of sublayers or the maximum number of sublayers minus a constant value. Moreover, the method comprises generating the video data stream such that the decoding parameter set comprises a second indication value that indicates, according to the information stored in the decoding parameter set, the maximum number of sublayers or the maximum number of sublayers minus the constant value. The method comprises generating the video data stream such that the first indication value is smaller than or equal to the second indication value.

Furthermore, according to an embodiment, a method for encoding a video into a video data stream, such that the video data stream has the video encoded thereinto, is provided. The method comprises generating the video data stream such that the video data stream comprises a sequence parameter set and a decoding parameter set. Moreover, the method comprises generating the video data stream such that the sequence parameter set comprises a first indication value that indicates, according to the information stored in the sequence parameter set, a maximum number of sublayers or the maximum number of sublayers minus a constant value. Furthermore, the method comprises generating the video data stream such that the decoding parameter set comprises a second indication value that indicates, according to the information stored in the decoding parameter set, the maximum number of sublayers or the maximum number of sublayers minus the constant value. The second indication value of the decoding parameter set is an upper bound having precedence over the first indication value of the sequence parameter set.

Moreover, according to an embodiment, a method for receiving a video data stream as an input bitstream, wherein video data stream has a video encoded thereinto, is provided. The video data stream comprises a sequence parameter set and a decoding parameter set. The sequence parameter set comprises a first indication value that indicates, according to the information stored in the sequence parameter set, a maximum number of sublayers or the maximum number of sublayers minus a constant value. The decoding parameter set comprises a second indication value that indicates, according to the information stored in the decoding parameter set, the maximum number of sublayers or the maximum number of sublayers minus the constant value, If the first indication value is greater than the second indication value, the method comprises processing the input bitstream to generate an output bitstream such that the output bitstream comprises the second indication value as an indication on a maximum number of sublayers or on a maximum number of sublayers minus the constant value.

Moreover, computer programs for implementing one of the above-described methods when being executed on a computer or signal processor are provided.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 6 to FIG. 8. Thereinafter the description of embodiments of the concept of the present invention is presented along with a description as to how such concepts could be built into the encoder and decoder of FIG. 6 and FIG. 7, respectively, although the embodiments described with FIG. 1 to FIG. 3 and following, may also be used to form encoders and decoders not operating according to the coding framework underlying the encoder and decoder of FIG. 6 and FIG. 7.

Figure 6:
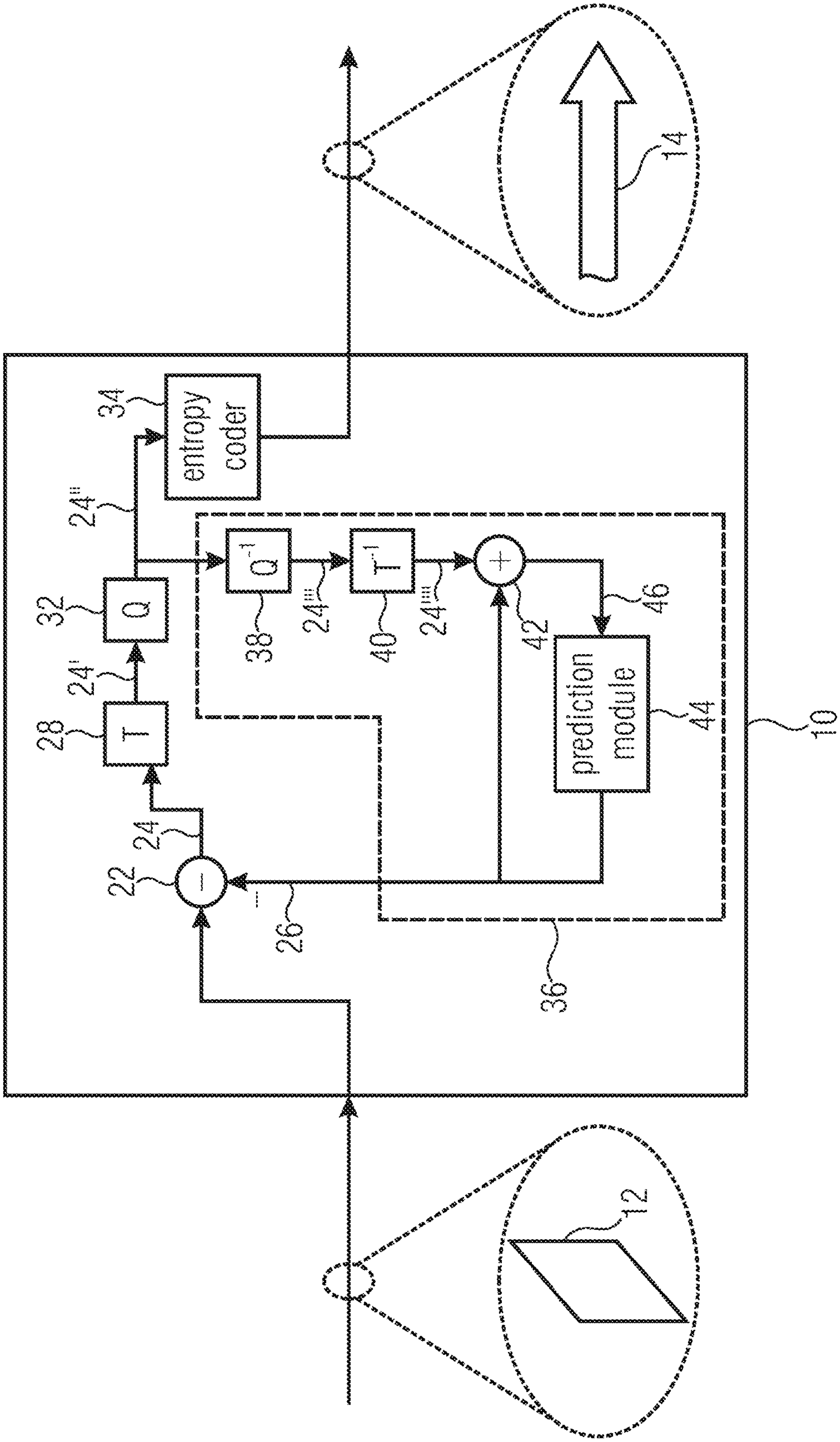
FIG. 6 illustrates a video encoder.
Figure 7:
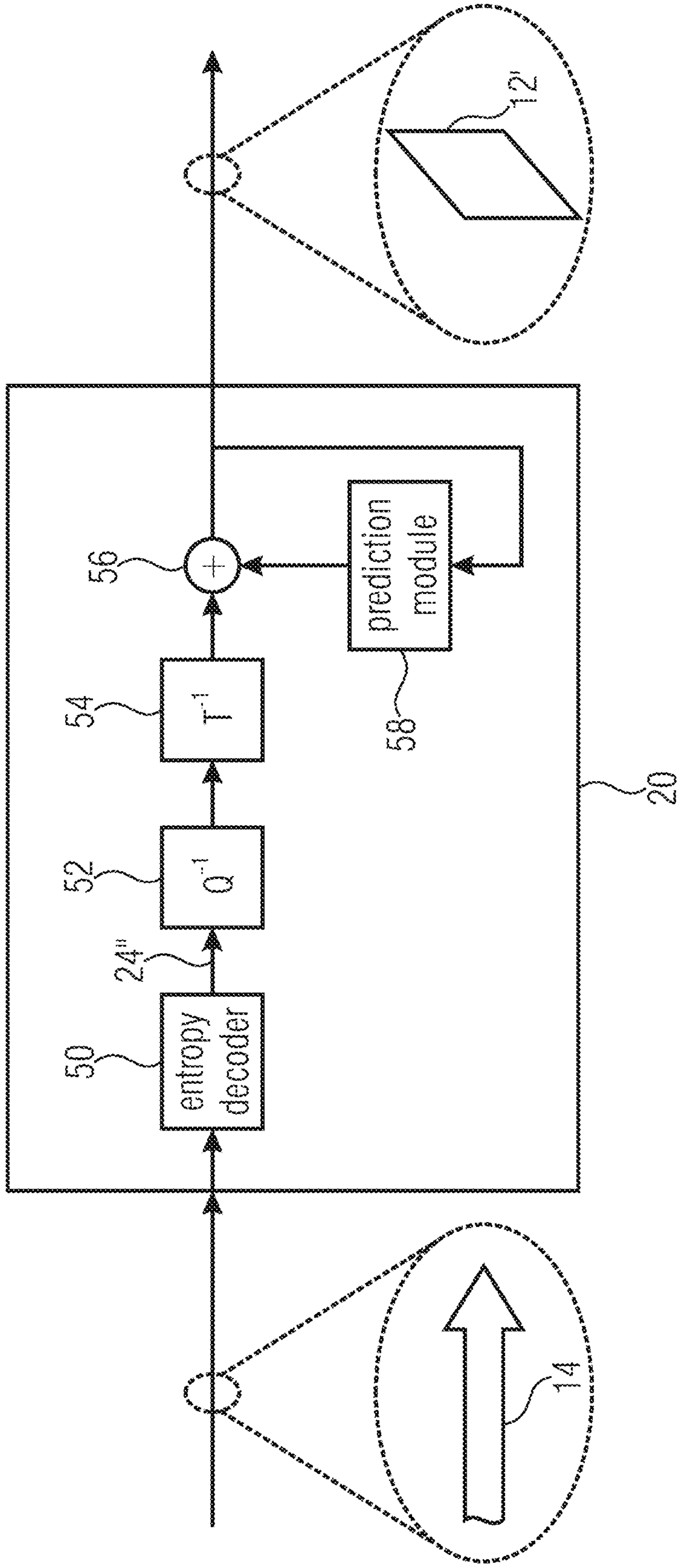
FIG. 7 illustrates a video decoder.

FIG. 6 shows a video encoder, an apparatus for predictively coding a picture 12 into a data stream 14 exemplarily using transform-based residual coding. The apparatus, or encoder, is indicated using reference sign 10. FIG. 7 shows a corresponding video decoder 20, e.g., an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 6 and FIG. 7 exemplarily use transform based prediction residual coding, although embodiments of the present application are not restricted to this kind of prediction residual coding. This is true for other details described with respect to FIG. 6 and FIG. 7, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, e.g., from the picture 12. The prediction residual signal former 22 may, for instance, be a subtractor which subtracts the prediction signal from the original signal, e.g., from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 6, comprise a dequantizer 38 which dequantizes prediction residual signal 24" so as to gain spectral-domain prediction residual signal 24'", which corresponds to signal 24' except for quantization loss, followed by an inverse transformer 40 which subjects the latter prediction residual signal 24'" to an inverse transformation, e.g., a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, e.g., a reconstruction of the original signal 12. Reconstructed signal 46 may correspond to signal 12'. A prediction module 44 of prediction stage 36 then generates the prediction signal 26 on the basis of signal 46 by using, for instance, spatial prediction, e.g., intra-picture prediction, and/or temporal prediction, e.g., inter-picture prediction.

Likewise, decoder 20, as shown in FIG. 7, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 7, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, e.g., coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 8:
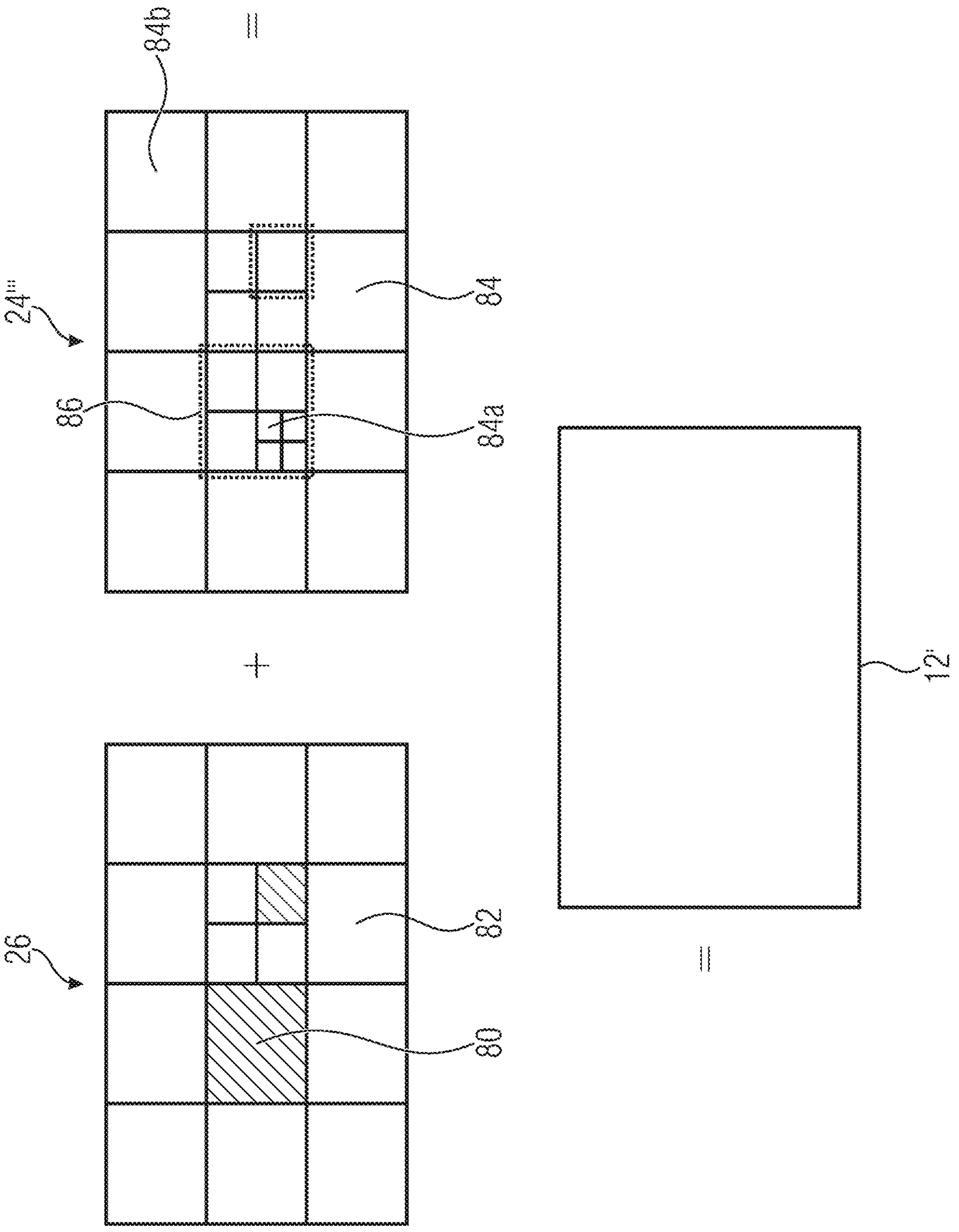
FIG. 8 illustrates the relationship between the reconstructed signal, e.g., the reconstructed picture, on the one hand, and the combination of the prediction residual signal as signaled in the data stream, and the prediction signal, on the other hand.

FIG. 8 illustrates the relationship between the reconstructed signal, e.g., the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 8 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 8 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 8 is also illustrated as a subdivision of the picture area into blocks 84. These blocks might be called transform blocks in order to distinguish same from the coding blocks 80 and 82. In effect, FIG. 8 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, e.g., each coding block 80 and 82, may concurrently form a transform block 84, but FIG. 8 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, e.g., the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 8 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 8, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 6 to FIG. 8 have been presented as an example where the inventive concept described further below may be implemented in order to form specific examples for encoders and decoders according to the present application. Insofar, the encoder and decoder of FIG. 6 and FIG. 7, respectively, may represent possible implementations of the encoders and decoders described herein below. FIG. 6 and FIG. 7 are, however, only examples. An encoder according to embodiments of the present application may, however, perform block-based encoding of a picture 12 using the concept outlined in more detail below and being different from the encoder of FIG. 6 such as, for instance, in that same is no video encoder, but a still picture encoder, in that same does not support inter-prediction, or in that the sub-division into blocks 80 is performed in a manner different than exemplified in FIG. 8. Likewise, decoders according to embodiments of the present application may perform block-based decoding of picture 12' from data stream 14 using the coding concept further outlined below, but may differ, for instance, from the decoder 20 of FIG. 7 in that same is no video decoder, but a still picture decoder, in that same does not support intra-prediction, or in that same sub-divides picture 12' into blocks in a manner different than described with respect to FIG. 8 and/or in that same does not derive the prediction residual from the data stream 14 in transform domain, but in spatial domain, for instance.

Figure 1:
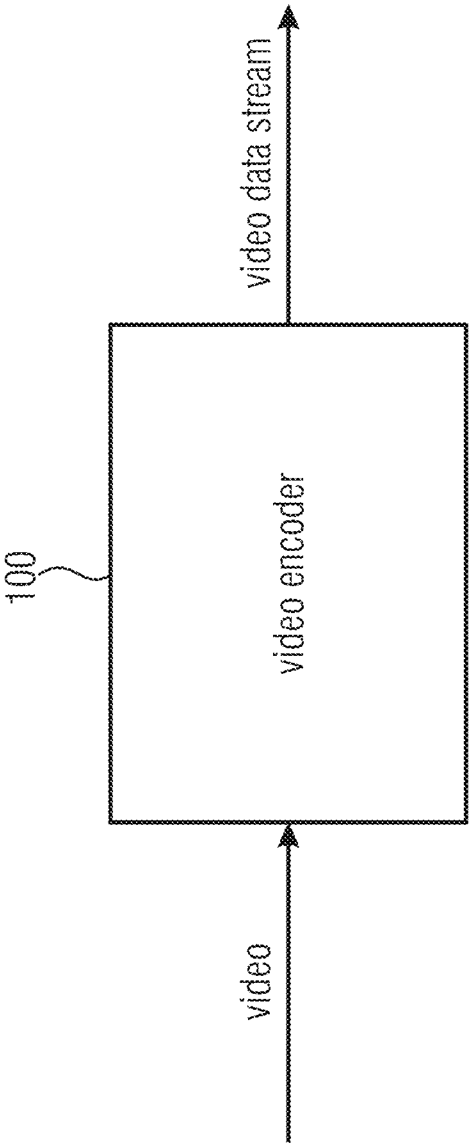
FIG. 1 illustrates a video encoder for encoding a video into a video data stream according to an embodiment.

FIG. 1 illustrates a video encoder 100 for encoding a video into a video data stream according to an embodiment. The video encoder 100 is configured to generate the video data stream.

Figure 2:
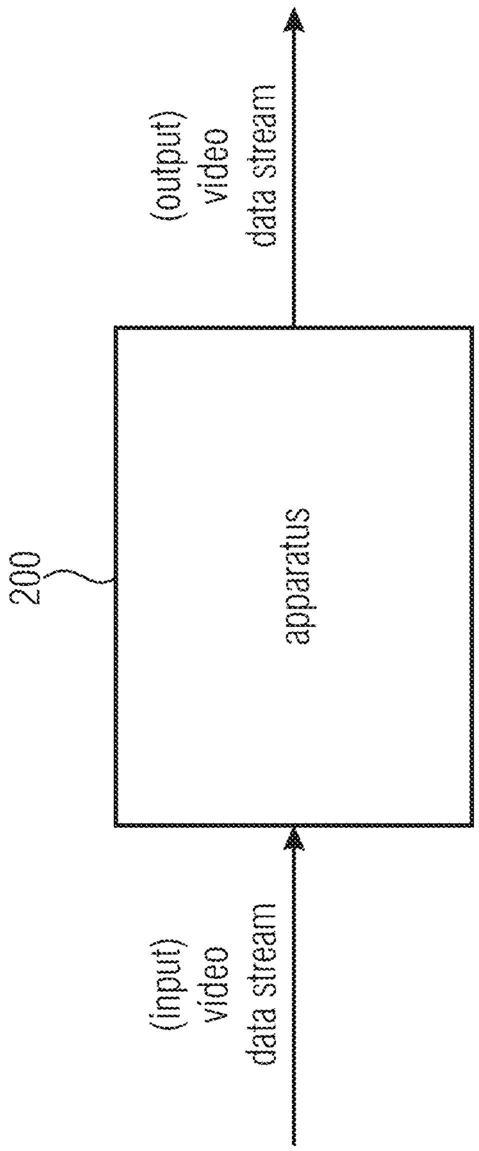
FIG. 2 illustrates an apparatus for receiving an input video data stream according to an embodiment.

FIG. 2 illustrates an apparatus 200 for receiving an input video data stream according to an embodiment. The input video data stream has a video encoded thereinto. The apparatus 200 is configured to generate an output video data stream from the input video data stream.

Figure 3:
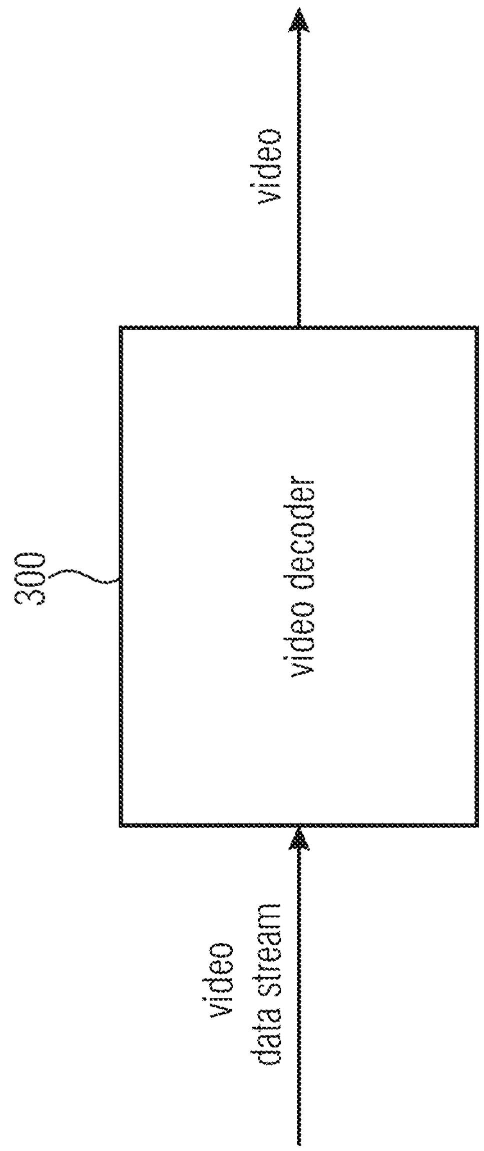
FIG. 3 illustrates a video decoder for receiving a video data stream having a video stored therein according to an embodiment.

FIG. 3 illustrates a video decoder 300 for receiving a video data stream having a video stored therein according to an embodiment. The video decoder 300 is configured to decode the video from the video data stream.

Moreover, a system according to an embodiment is provided. The system comprises the apparatus of FIG. 2 and the video decoder of FIG. 3. The video decoder (300) of FIG. 3 is configured to receive the output video data stream of the apparatus (200) of FIG. 2. The video decoder 300 of FIG. 3 is configured to decode the video from the output video data stream of the apparatus 200 of FIG. 2.

In an embodiment, the system may, e.g., further comprise a video encoder 100 of FIG. 1. The apparatus 200 of FIG. 2 may, e.g., be configured to receive the video data stream from the video encoder 100 of FIG. 1 as the input video data stream.

The (optional) intermediate device 210 of the apparatus 200 may, e.g., be configured to receive the video data stream from the video encoder 100 as an input video data stream and to generate an output video data stream from the input video data stream. For example, the intermediate device may, e.g., be configured to modify (header/meta data) information of the input video data stream and/or may, e.g., be configured to delete pictures from the input video data stream and/or may configured to mix/splice the input video data stream with an additional second bitstream having a second video encoded thereinto.

The (optional) video decoder 221 may, e.g., be configured to decode the video from the output video data stream.

The (optional) Hypothetical Reference Decoder 222 may, e.g., be configured to determine timing information for the video depending on the output video data stream, or may, e.g., be configured to determine buffer information for a buffer into which the video or a portion of the video is to be stored.

The system comprises the video encoder 101 of FIG. 1 and the video decoder 151 of FIG. 2.

The video encoder 101 is configured to generate the encoded video signal. The video decoder 151 is configured to decode the encoded video signal to reconstruct the picture of the video.

In the following, trick modes and fast playback are described.

According to an embodiment, an apparatus for receiving a video data stream as an input bitstream, wherein the video data stream has a video encoded thereinto, is provided. For a playback speed modification factor (Nx), the apparatus is to determine a decoding capability requirement depending on a decoding capability requirement limit. The playback speed modification factor (Nx) is a forward playback speed modification factor or is a backward playback speed modification factor.

In an embodiment, the decoding capability requirement may, e.g., be a modified sample rate. The decoding capability requirement limit may, e.g., be a sample rate limit.

According to an embodiment, the video data stream may, e.g., comprise information on the sample rate limit.

In an embodiment, the apparatus may, e.g., be configured to determine the modified sample rate depending on a picture size of a picture of the video.

According to an embodiment, the apparatus may, e.g., be configured to determine the modified sample rate further depending on a framerate and depending on the playback speed modification factor (Nx). The video data stream may, e.g., comprise information on the framerate.

In an embodiment, the framerate depends on a sublayer of one or more sublayers. The video data stream may, e.g., comprise sub-layer specific framerate information for each of the one or more sublayers. The apparatus may, e.g., be configured to obtain the framerate from the sub-layer specific framerate information for one of the one or more sublayers.

According to an embodiment, the apparatus may, e.g., be configured to determine the modified sample rate depending on the picture size of a picture of the video, being a highest picture size among a plurality of pictures of the video.

In an embodiment, the video data stream may, e.g., comprise an application factor. The apparatus may, e.g., be configured to compute the modified sample rate using the highest layer picture size and the application factor.

According to an embodiment, the highest picture size depends on a sublayer of one or more sublayers. The video data stream may, e.g., comprise sub-layer specific maximum picture size information for each of the one or more sublayers. The apparatus may, e.g., be configured to obtain the highest picture size from the sub-layer specific maximum picture size information for one of the one or more sublayers.

In an embodiment, the video data stream may, e.g., comprise an application factor. The apparatus may, e.g., be configured to determine the modified sample rate using a sample rate of the video and using the application factor.

According to an embodiment, the decoding capability requirement may, e.g., be a modified bitrate. The decoding capability requirement limit may, e.g., be a bitrate limit.

In an embodiment, the video data stream may, e.g., comprise information on the bitrate limit.

According to an embodiment, the apparatus may, e.g., be configured to determine the modified bitrate depending on an initial bitrate of the video data stream and depending on the playback speed modification factor (Nx).

In an embodiment, the initial bitrate depends on a sublayer of one or more sublayers. The video data stream may, e.g., comprise sub-layer specific initial bitrate information for each of the one or more sublayers. The apparatus may, e.g., be configured to obtain the initial bitrate from the sub-layer specific framerate information for one of the one or more sublayers.

According to an embodiment, the video data stream may, e.g., comprise an IRAP-only flag (IRAP=Intra random access point) which indicates whether or not decoding of only IRAP pictures may take place when an initial playback speed may, e.g., be increased. Depending on the IRAP-only flag, the apparatus may, e.g., be configured to read a decoding capability requirement from the video data stream.

In an embodiment, the video data stream may, e.g., comprise an reference-pictures-only flag which indicates whether or not decoding of only reference pictures may take place when an initial playback speed may, e.g., be increased. Depending on the reference-pictures-only flag, the apparatus may, e.g., be configured to read a decoding capability requirement from the video data stream.

Moreover, according to an embodiment, a video data stream having a video encoded thereinto is provided. The video data stream may, e.g., comprise information on a sample rate limit, and/or the video data stream may, e.g., comprise information on a bitrate limit.

According to an embodiment, the video data stream may, e.g., comprise information on a framerate.

In an embodiment, the video data stream may, e.g., comprise sub-layer specific framerate information for each of one or more sublayers.

According to an embodiment, the video data stream may, e.g., comprise an application factor for determining a modified sample rate.

In an embodiment, the video data stream may, e.g., comprise sub-layer specific maximum picture size information for each of one or more sublayers.

According to an embodiment, the video data stream may, e.g., comprise sub-layer specific initial bitrate information for each of one or more sublayers.

In an embodiment, the video data stream may, e.g., comprise an IRAP-only flag which indicates whether or not decoding of only IRAP pictures may take place when an initial playback speed may, e.g., be increased.

According to an embodiment, the video data stream may, e.g., comprise an reference-pictures-only flag which indicates whether or not decoding of only reference pictures may take place when an initial playback speed may, e.g., be increased.

In an embodiment, depending on the IRAP-only flag, the video data stream may, e.g., comprise level information; and/or, depending on the reference-pictures-only flag, the video data stream may, e.g., comprise level information.

Furthermore, according to an embodiment, a video encoder for encoding a video into a video data stream, such that the video data stream has the video encoded thereinto, is provided. The video encoder is to generate the video data stream such that the video data stream comprises information on a sample rate limit, and/or the video encoder is to generate the video data stream such that the video data stream comprises information on a bitrate limit.

In an embodiment, the video encoder may, e.g., be configured to generate the video data stream such that the video data stream may, e.g., comprise information on a framerate.

According to an embodiment, the video encoder may, e.g., be configured to generate the video data stream such that the video data stream may, e.g., comprise sub-layer specific framerate information for each of one or more sublayers.

In an embodiment, the video encoder may, e.g., be configured to generate the video data stream such that the video data stream may, e.g., comprise an application factor for determining a modified sample rate.

According to an embodiment, the video encoder may, e.g., be configured to generate the video data stream such that the video data stream may, e.g., comprise sub-layer specific maximum picture size information for each of one or more sublayers.

In an embodiment, the video encoder may, e.g., be configured to generate the video data stream such that the video data stream may, e.g., comprise sub-layer specific initial bitrate information for each of one or more sublayers.

According to an embodiment, the video encoder may, e.g., be configured to generate the video data stream such that the video data stream may, e.g., comprise an IRAP-only flag which indicates whether or not decoding of only IRAP pictures may take place when an initial playback speed may, e.g., be increased.

In an embodiment, the video encoder may, e.g., be configured to generate the video data stream such that the video data stream may, e.g., comprise an reference-pictures-only flag which indicates whether or decoding of only reference pictures may take place when an initial playback speed may, e.g., be increased.

According to an embodiment, the video encoder may, e.g., be configured to generate the video data stream such that, depending on the IRAP-only flag, the video data stream may, e.g., comprise level information; and/or, the video encoder may, e.g., be configured to generate the video data stream such that, depending on the reference-pictures-only flag, the video data stream may, e.g., comprise level information.

In an embodiment, the apparatus may, e.g., be configured to decode the input bitstream to decode the video.

Moreover, according to an embodiment, a system for encoding a video into a video data stream and for decoding the video is provided. The system comprises a video encoder as described above an apparatus as described above. The video encoder is to encode the video into the video data stream, such that the video data stream has the video encoded thereinto. The apparatus is to receive the video data stream as an input bitstream. Moreover, the apparatus is to decode the input bitstream to decode the video.

Fast forward operation or reverse operation (backwards fast playback) are typical operations that are carried out at video applications. Typically, those operations, consist of decoding only a subset of the bitstream and decoded it a higher speed than the one indicated at the bitstream, e.g. framerate. Also even for non-trick modes operation, playing the video at a higher speed might be of interest in some scenarios. Although, there is not a big difference in fast forward a fast play back the differentiation considered in this description could be that the second targets a continuous and smooth playback (even potentially with audio playback and synchronization) while the first one does not, e.g. fast forward could be a discontinuous play back with a lot of "jumps" in the content. In any case, the result is that the content is played back at Nx speed.

Obviously, playing back the content at higher speed requires decoding the bitstream at higher speed as well, which leads to higher decoding capabilities requirements, i.e. higher level, as a result of a higher sample rate and higher bitrate as the one indicated in the HRD parameters.

When Reference Picture Resampling (RPR) is not used, i.e. all pictures within a CVS or bitstream have the same size, the sample rate can be easily computed as the picture size in samples divided by the framerate and multiplied by the speed up factor Nx. Similarly, the Bitrate would be multiplied by the speed up factor Nx.

In a first embodiment, the described two values derived as discussed above are checked against the level limits in VVC and the level to which the Nx speed up belongs is computed as the smallest value for which the derived values are smaller than the level limits.

Note that the framerate or bitrate are sub-layer specific, which means that whatever is the sub-layer played back (e.g. fast forward is carried out only by decoding temporal level 0) the corresponding values are computed using the sub-layer specific signaled framerate or bitrate.

However, when Reference Picture Resampling (RPR) is used, the sample rate cannot be easily derived, i.e. only the worst case for the highest picture size can be used, which would lead to a derived worst-case sample rate. An example of how RPR could be used together with temporal scalability is illustrated in FIG. 4.

Figure 4:
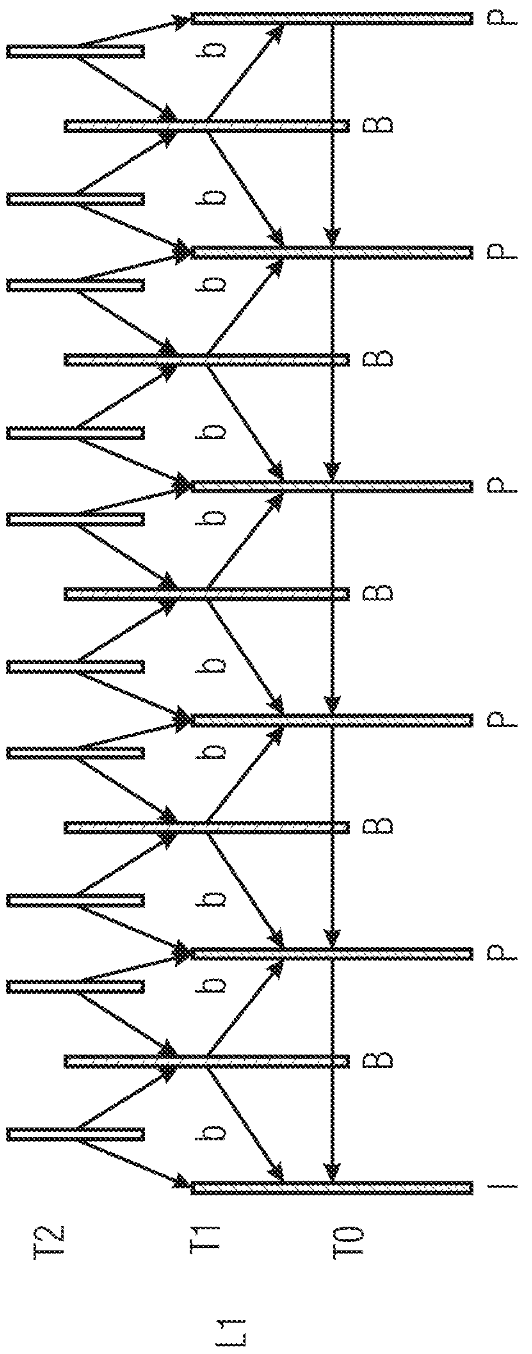
FIG. 4 illustrates an example for using reference picture resampling together with temporal scalability.

FIG. 4 illustrates an example for using reference picture resampling together with temporal scalability.

In the example, it could be that the lowest sub-layers have a picture size of 1920×1080 and that the highest sub-layer has a picture size of 960×540. By just using the maximum picture size and assuming a 60 fps bitstream one would derive a sample rate of around $124*10^6$ samples per second while the actual value would be around $78*10^6$, i.e. the worst case would be 1.6 times higher than the real value.

In one embodiment, the bitstream contains an indication about the factor that needs to be applied to the sample rate derived with the worst-case value. With the signaled factor, one could derive the worst-case sample rate, divide it by the signaled factor and multiple by the speed decoding factor to compute the actual sample rate by the speed up decoding operation.

In another embodiment, the maximum picture size value is indicated per sub-layer, which would lead to a better approximation or to even a correct value derivation if the pictures sizes do not change within a sub-layer.

In addition, there are some cases, where sub-layers are not fully used. Sometimes, fast forward is carried out by only decoding and playing back either IRAP pictures (e.g. IDRs) or pictures that are not non-reference pictures. However, it is not clear what is the level required to decode such a sub-bitstream when decoded with a Nx speed. In a further embodiment, an additional level signaling is indicated for either one of the 2 cases:

IRAP only: only the IRAPs are decoded.

Only reference pictures: Non-reference pictures are discarded and the rest is decoded.

The syntax of such an embodiment could look as follows.

For profile_tier_level:

| | Descriptor |
|---|---|
| profile_tier_level( profileTierPresentFlag, maxNumSubLayersMinus1 ) { | |
| if( profileTierPresentFlag ) { | |
| general_profile_idc | u(7) |
| general_tier_flag | u(1) |
| general_constraint_info( ) | |
| } | |
| general_level_idc | u(8) |
| if( profileTierPresentFlag ) { | |
| num_sub_profiles | u(8) |
| for( i = 0; i < num_sub_profiles; i++ ) | |
| general_sub_profile_idc[ i ] | u(32) |
| } | |
| for( i = 0; i < maxNumSubLayersMinus1; i++ ) | |
| sublayer_level_present_flag[ i ] | u(1) |
| while( !byte_aligned( ) ) | |
| ptl_alignment_zero_bit | f(1) |
| for( i = 0; i < maxNumSubLayersMinus1; i++ ) | |
| if( sublayer_level_present_flag[ i ] ) | |
| sublayer_level_idc[ i ] | u(8) |
| irap_only_level_present_flag | u(1) |
| if( irap_only_level_present_flag) | |
| irap_only_level_idc | u(8) |
| } | |

Similar to the irap only case the reference pictures only could be added to the syntax.

The bitrate and CPB size could similarly be signaled as:

| | Descriptor |
|---|---|
| ols_hrd_parameters( firstSubLayer, maxSubLayers ) { | |
| for( i = firstSubLayer; i <= maxSubLayers; i++ ) { | |
| fixed_pic_rate_general_flag[ i ] | u(1) |
| if( !fixed_pic_rate_general_flag[ i ] ) | |
| fixed_pic_rate_within_cvs_flag[ i ] | u(1) |

-continued

```
                                                    Descriptor
    if( fixed_pic_rate_within_cvs_flag[ i ] )
      elemental_duration_in_tc_minus1[ i ]          ue(v)
    else if( hrd_cpb_cnt_minus1 = = 0 )
      low_delay_hrd_flag[ i ]                       u(1)
    if( general_nal_hrd_params_present_flag )
      sublayer_hrd_parameters( i )
    if( general_vcl_hrd_params_present_flag )
      sublayer_hrd_parameters( i )
  }
  irap_only_hrd_flag                                u(1)
  if( irap_only_hrd_flag ) {
    if( general_nal_hrd_params_present_flag )
      sublayer_hrd_parameters( maxSubLayers + 1 )
    if( general_vcl_hrd_params_present_flag )
      sublayer_hrd_parameters( maxSubLayers + 1 )
  }
}
```

In the following, guarding the delay_for_concatenation_ensured_flag is described.

According to an embodiment, a video data stream having a video encoded thereinto is provided. The video data stream comprises a plurality of access units, wherein a group of access units of the video data stream comprises the plurality of access units. Moreover, the video data stream comprises an indication for each access unit of a subset of access units indicating that a seamless splicing point exists after said access unit. The subset of access units is a proper subset of the group of access units of the video data stream.

In an embodiment, the video data stream may, e.g., comprise a plurality of temporal sublayers. The indication that a seamless splicing point exists after an access unit, only exists for access units of a first group of temporal sublayers of the plurality of temporal sublayers, but the indication that a seamless splicing point exists after an access unit, does not exist for access units of a second group of temporal sublayers of the plurality of temporal sublayers.

According to an embodiment, the video data stream may, e.g., comprise a buffering period supplemental enhancement information. The buffering period supplemental enhancement information indicates a subset of access units of the plurality of access units for which the seamless splicing point exists after said access unit.

In an embodiment, the video data stream may, e.g., comprise a divisor. A delay value may, e.g., be assigned to each access unit of the plurality of access units of the video data stream. The indication that indicates a seamless splicing point exists an said access unit, only exists for those access units of the plurality of access units of the video data stream which have a delay value assigned, which, when being divided by the divisor, may, e.g., be equal to a remainder value.

According to an embodiment, the remainder value may, e.g., be 0.

In an embodiment, the video data stream may, e.g., comprise the remainder value.

According to an embodiment, the indication for each access unit of the subset of access units indicating that a seamless splicing point exists after said access unit, may, e.g., be a flag.

In an embodiment, the flag may, e.g., be a delay_for_concatenation_ensured_flag.

According to an embodiment, the flag exhibits a first value, if a constant framerate for output pictures which result from decoding the video data stream may, e.g., be not ensured. The flag may, e.g., exhibit a second value being different from the first value, if a constant framerate for output pictures which result from decoding the video data stream may, e.g., be ensured.

In an embodiment, the flag exhibits the second value, if the output pictures which result from decoding the video data stream have an equidistant output time.

Moreover, according to an embodiment, a video encoder for encoding a video into a video data stream, such that the video data stream has the video encoded thereinto, is provided. The video encoder is to generate the video data stream such that the video data stream comprises a plurality of access units, wherein a group of access units of the video data stream comprises the plurality of access units. Furthermore, the video encoder is to generate the video data stream such that the video data stream comprises an indication for each access unit of a subset of access units indicating that a seamless splicing point exists after said access unit. Moreover, the video encoder is to generate the video data stream such that the subset of access units is a proper subset of the group of access units of the video data stream.

In an embodiment, the video encoder may, e.g., be configured to generate the video data stream such that the video data stream may, e.g., comprise a plurality of temporal sublayers. The video encoder may, e.g., be configured to generate the video data stream such that the indication that a seamless splicing point exists after an access unit, only exists for access units of a first group of temporal sublayers of the plurality of temporal sublayers, but the video encoder may, e.g., be configured to generate the video data stream such that the indication that a seamless splicing point exists after an access unit, does not exist for access units of a second group of temporal sublayers of the plurality of temporal sublayers.

According to an embodiment, the video encoder may, e.g., be configured to generate the video data stream such that the video data stream may, e.g., comprise a buffering period supplemental enhancement information. The video encoder may, e.g., be configured to generate the video data stream such that the buffering period supplemental enhancement information indicates a subset of access units of the plurality of access units for which the seamless splicing point exists after said access unit.

In an embodiment, the video encoder may, e.g., be configured to generate the video data stream such that the video data stream may, e.g., comprise a divisor. The video encoder may, e.g., be configured to generate the video data stream such that a delay value may, e.g., be assigned to each access unit of the plurality of access units of the video data stream. The video encoder may, e.g., be configured to generate the video data stream such that the indication that indicates a seamless splicing point exists an said access unit, only exists for those access units of the plurality of access units of the video data stream which have a delay value assigned, which, when being divided by the divisor, may, e.g., be equal to a remainder value.

According to an embodiment, the video encoder may, e.g., be configured to generate the video data stream such that the remainder value may, e.g., be 0.

In an embodiment, the video encoder may, e.g., be configured to generate the video data stream such that the video data stream may, e.g., comprise the remainder value.

According to an embodiment, the video encoder may, e.g., be configured to generate the video data stream such that the indication for each access unit of the subset of access units indicating that a seamless splicing point exists after said access unit, may, e.g., be a flag.

In an embodiment, the video encoder may, e.g., be configured to generate the video data stream such that the flag may, e.g., be a delay_for_concatenation_ensured_flag.

According to an embodiment, the video encoder may, e.g., be configured to generate the video data stream such that the flag exhibits a first value, if a constant framerate for output pictures which result from decoding the video data stream may, e.g., be not ensured. The video encoder may, e.g., be configured to generate the video data stream such that the flag exhibits a second value being different from the first value, if a constant framerate for output pictures which result from decoding the video data stream may, e.g., be ensured.

In an embodiment, the video encoder may, e.g., be configured to generate the video data stream such that the flag exhibits the second value, if the output pictures which result from decoding the video data stream have an equidistant output time.

Furthermore, according to an embodiment, an apparatus for receiving a video data stream as an input bitstream, wherein the video data stream has a video encoded thereinto, is provided. The apparatus is to process the video data stream. The video data stream comprises a plurality of access units, wherein a group of access units of the video data stream comprises the plurality of access units. Moreover, the video data stream comprises an indication for each access unit of a subset of access units indicating that a seamless splicing point exists after said access unit. The subset of access units is a proper subset of the group of access units of the video data stream. The apparatus is to process the indication.

In an embodiment, the video data stream may, e.g., comprise a plurality of temporal sublayers. The indication that a seamless splicing point exists after an access unit, only exists for access units of a first group of temporal sublayers of the plurality of temporal sublayers, but the indication that a seamless splicing point exists after an access unit, does not exist for access units of a second group of temporal sublayers of the plurality of temporal sublayers.

According to an embodiment, the video data stream may, e.g., comprise a buffering period supplemental enhancement information. The buffering period supplemental enhancement information indicates a subset of access units of the plurality of access units for which the seamless splicing point exists after said access unit. The apparatus may, e.g., be configured to process the buffering period supplemental enhancement information.

In an embodiment, the video data stream may, e.g., comprise a divisor. The apparatus may, e.g., be configured to receive the divisor. A delay value may, e.g., be assigned to each access unit of the plurality of access units of the video data stream. The indication that indicates a seamless splicing point exists an said access unit, only exists for those access units of the plurality of access units of the video data stream which have a delay value assigned, which, when being divided by the divisor, may, e.g., be equal to a remainder value.

According to an embodiment, the remainder value may, e.g., be 0.

In an embodiment, the video data stream may, e.g., comprise the remainder value. The apparatus may, e.g., be configured to receive the remainder value.

According to an embodiment, the indication for each access unit of the subset of access units indicating that a seamless splicing point exists after said access unit, may, e.g., be a flag. The apparatus may, e.g., be configured to process the flag.

In an embodiment, the flag may, e.g., be a delay_for_concatenation_ensured_flag.

According to an embodiment, the flag exhibits a first value, if a constant framerate for output pictures which result from decoding the video data stream may, e.g., be not ensured. The flag exhibits a second value being different from the first value, if a constant framerate for output pictures which result from decoding the video data stream may, e.g., be ensured.

In an embodiment, the flag exhibits the second value, if the output pictures which result from decoding the video data stream have an equidistant output time.

According to an embodiment, the apparatus may, e.g., be configured to decode the input bitstream to decode the video.

Moreover, according to an embodiment, a system for encoding a video into a video data stream and for decoding the video is provided. The system comprises a video encoder as described above and an apparatus as described above. The video encoder is to encode the video into the video data stream, such that the video data stream has the video encoded thereinto. The apparatus is to receive the video data stream as an input bitstream. Furthermore, the apparatus is to decode the input bitstream to decode the video.

In the current VVC draft specification, there exists an indication that allows a splicing device, i.e. a device that concatenates part of bitstream A and bitstream B, to find AUs in bitstream A that allow for seamless splicing of bitstream B. Seamless splicing refers to the fact that CPB removal time distance between last AU of bitstream A and first AU of bitstream B is the same as the CPB removal time of two consecutive AUs of the bitstream A. On the contrary non-seamless splicing would mean that due to the first AU of the bitstream B not being able to be sent to CPB of the decoder at the right time (i.e. the last AU of the bitstream A requires longer than desired to be sent) the decoding (CPB removal) of the first AU of bitstream B needs to be delayed, not achieving to decode the AU as soon as desirable. The current Picture Timing SEI message in the VVC draft specification entails a flag by the name of delay_for_concatenation_ensured_flag that when set to 1 indicates for the particular associated AU that splicing at this bitstream position will be seamless as long as the following AU (i.e. beginning of bitstream B) has a BP SEI message with concatenation_flag equal to 1 and an selected InitCpbRemovalDelay less than or equal to the value of max_initial_removal_delay_for_concatenation as indicated in bitstream A. Thereby all of these AUs of bitstream A for which the delay_for_concatenation_ensured_flag represent viable options for seamless splicing.

The problem is that not all of these access units for which the above property is given will also represent meaningful splicing points and that delay_for_concatenation_ensured_flag is signalled even for not-meaningful splicing points which might lead some less well implemented splicing devices to splice at such a less optimal position. Apart from that, the indication of delay_for_concatenation_ensured_flag for all access units, even the ones that are not a meaningful splicing point incurs a bitrate overhead and a processing overhead on encoder side in order to set the flag value correctly even when it is of no use to a splicing device. Not-meaningful splicing points in this context means that even though the frame rate at the actual splicing point is maintained, it may be that some of these splicing points would omit part of bitstream A are left out leading to a non-continuous playout of bitstream A before the splicing point, e.g. splicing in the middle of the hierarchical GOP. An example is illustrated in FIG. 5 wherein two bitstream (A and B) are spliced at two positions (I and II) the first options (top) leading to a constant framerate throughout the example whereas the second option (bottom) leads to a framerate drop due to the wrong splicing point chosen.

Figure 5:
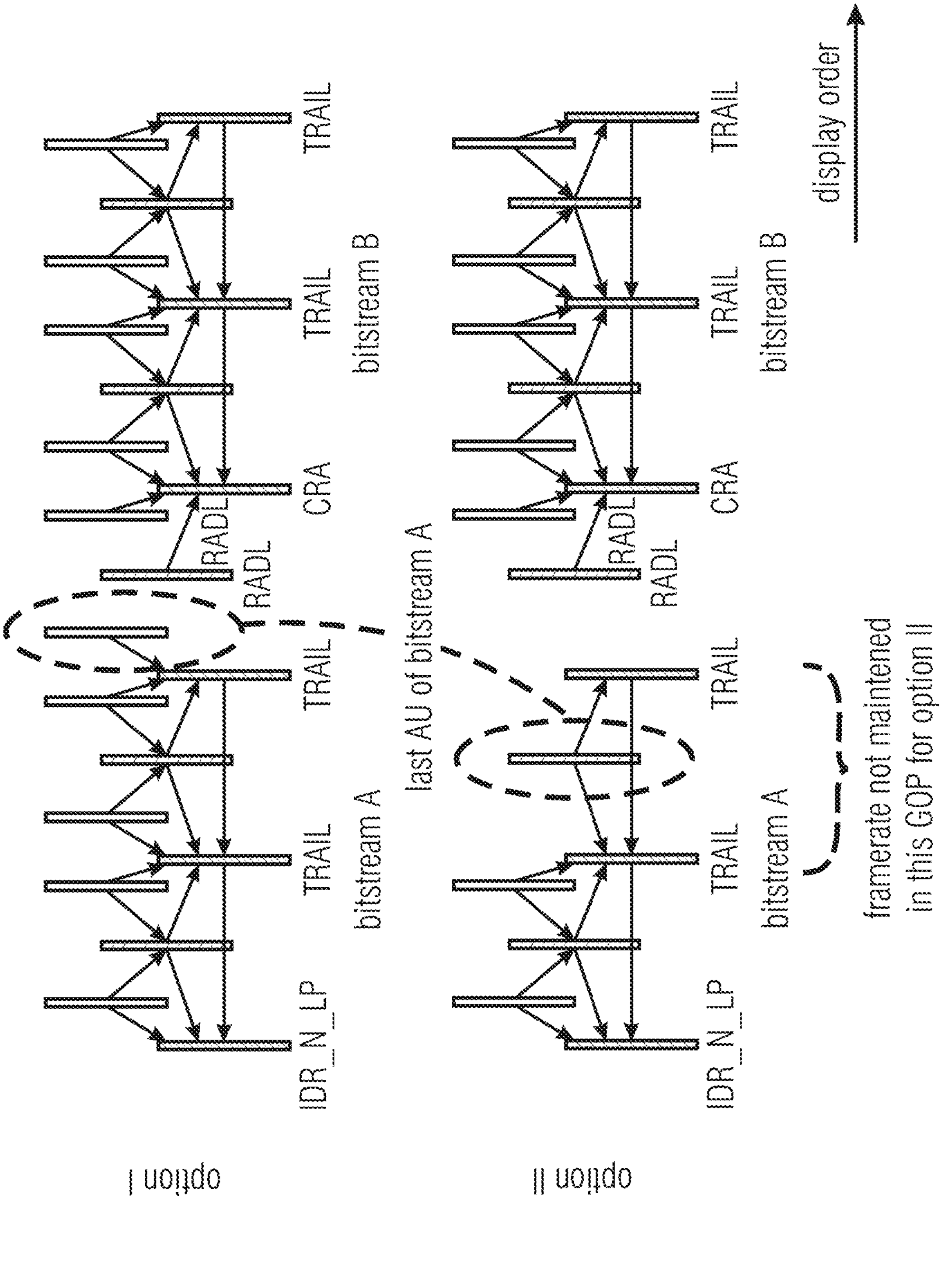
FIG. 5 illustrates two splicing point options wherein option I (top) maintains the frame rate throughout the example and option II (bottom) has a framerate drop in the last group of picture of a bitstream.

FIG. 5 illustrates two splicing point options wherein option I (top) maintains the frame rate throughout the example and option II (bottom) has a framerate drop in the last GOP of bitstream A.

Therefore, the invention is to reduce the signalling overhead and avoid misleading of splicing devices by selective signalling the delay_for_concatenation_ensured_flag for a subset of access units.

In one embodiment the delay_for_concatenation_ensured_flag is only signalled for AUs of specific temporal sublayers wherein the specific temporal sublayers are indicated in the associated BP SEI message.

In another embodiment the delay_for_concatenation_ensured_flag is only signalled at a subset of all AUs in the buffering period wherein the AU subset is identified with information from the associated BP SEI message.

In one embodiment the AU subset is indicated through signalling a divisor and optionally a remainder value. The delay_for_concatenation_ensured_flag in the PT SEI messages of the buffering period is only signalled when a value (e.g. cpb_removal_delay_minus1 or dpb_output_delay in the PT SEI message) of the associated AU divided by the divisor equals the optional remainder or, in its absence, equals zero.

In a further embodiment, the value of delay_for_concatenation_ensured_flag is set to 0 if the output pictures do not ensure constant framerate as shown in the figure. Note that the current specification only focuses currently on the decoding time and ensures that the AU with the flag to 1 fulfils that the difference between last arrival time (AU has completely arrived to the CPB) and the CPB removal delay fulfil condition (i.e. >threshold). Thus, an equidistance in decoding time of consecutive AUs is achieved. The invention here would add that if this flag is set to 1 also the output times of consecutive AUs in the bitstream A have an equidistant output time.

In the following, output layer set specific HRD is described.

According to an embodiment, an apparatus for receiving a video data stream as an input bitstream, wherein video data stream has a video encoded thereinto, is provided. The apparatus is to process the input bitstream depending on an output layer set to obtain a sub-bitstream. If the output layer set does not comprise a predefined layer (vps_layer_id [0]) of a plurality of layers that are present in the video data stream, the apparatus is to remove at least one non-scalable nested supplemental enhancement information message which is assigned with the predefined layer (c]). If the output layer set comprises the predefined layer (vps_layer_id [0]), the apparatus is configured to not remove any non-scalable nested supplemental enhancement information message which is assigned with the predefined layer (vps_layer_id [0]).

In an embodiment, if there is no output layer set that consists of all layers of the plurality of layers in a current coded video sequence of the video data stream, there may, e.g., be no non-scalable-nested supplemental enhancement information message with at least one of a buffering period payload and a picture timing payload and a decoding unit information payload.

According to an embodiment, if there is no output layer set that consists of all layers of the plurality of layers in the current coded video sequence of the video data stream, there may, e.g., be no non-scalable-nested supplemental enhancement information message with at least one of the buffering period payload and the picture timing payload and the decoding unit information payload and a subpicture level information payload.

In an embodiment, if there is no output layer set that consists of all layers of the plurality of layers in the current coded video sequence of the video data stream, there may, e.g., be no non-scalable-nested supplemental enhancement information message with a payload type being equal to a first value indicating the buffering period payload and or being equal to a second value indicating the picture timing payload or being equal to a third value indicating the decoding unit information payload or being equal to a fourth value indicating the subpicture level information payload.

According to an embodiment, for a non-scalable-nested supplemental enhancement information message having the payload type being equal to the first value, or being equal to the second value, or being equal to the third value, or being equal to the fourth value, the non-scalable-nested supplemental enhancement information message may, e.g., apply to all the output layer sets, when present, that consist of all layers in the current coded video sequence in the entire bitstream.

In an embodiment, if there is no output layer set that consists of all layers of the plurality of layers in the current coded video sequence of the video data stream, there may, e.g., be no non-scalable-nested supplemental enhancement information message with the payload type being equal to 0 indicating the buffering period payload, or being equal to 1 indicating the picture timing payload, or being equal to 130 indicating the decoding unit payload, or being equal to 203 indicating the subpicture level information payload.

According to an embodiment, for a non-scalable-nested supplemental enhancement information message having the payload type being equal to 0 or being equal to 1 or being equal to 130 or being equal to 203, the non-scalable-nested supplemental enhancement information message applies to all the output layer sets, when present, that consist of all layers in the current coded video sequence in the entire bitstream.

In an embodiment, if the output layer set does not comprise the predefined layer (vps_layer_id [0]), the apparatus may, e.g., be configured to remove all nested supplemental enhancement information messages which are assigned with the predefined layer (vps_layer_id [0]).

Moreover, according to an embodiment, a video data stream having a video encoded thereinto, is provided. The video data stream comprises a video parameter set. The video parameter set comprises a plurality of output layer sets. If none of the plurality of output layer sets comprises all layers of a plurality of layers that are present in the video data stream, the video data stream does not comprise any non-scalable nested supplemental enhancement information message for a hypothetical reference decoder.

In an embodiment, if there is no output layer set that consists of all layers of the plurality of layers in a current coded video sequence of the video data stream, there may, e.g., be no non-scalable-nested supplemental enhancement information message with at least one of a buffering period payload and a picture timing payload and a decoding unit information payload.

According to an embodiment, if there is no output layer set that consists of all layers of the plurality of layers in the current coded video sequence of the video data stream, there may, e.g., be no non-scalable-nested supplemental enhancement information message with at least one of the buffering period payload and the picture timing payload and the decoding unit information payload and a subpicture level information payload.

In an embodiment, if there is no output layer set that consists of all layers of the plurality of layers in the current coded video sequence of the video data stream, there may, e.g., be no non-scalable-nested supplemental enhancement information message with a payload type being equal to a first value indicating the buffering period payload, or being equal to a second value indicating the picture timing payload, or being equal to a third value indicating the decoding unit information payload, or being equal to a fourth value indicating the subpicture level information payload.

According to an embodiment, for a non-scalable-nested supplemental enhancement information message having the payload type being equal to the first value, or being equal to the second value, or being equal to the third value, or being equal to the fourth value, the non-scalable-nested supplemental enhancement information message may, e.g., apply to all the output layer sets, when present, that consist of all layers in the current coded video sequence in the entire bitstream.

In an embodiment, if there is no output layer set that consists of all layers of the plurality of layers in the current coded video sequence of the video data stream, there may, e.g., be no non-scalable-nested supplemental enhancement information message with the payload type being equal to 0 indicating the buffering period payload, or being equal to 1 indicating the picture timing payload, or being equal to 130 indicating the decoding unit payload, or being equal to 203 indicating the subpicture level information payload.

According to an embodiment, for a non-scalable-nested supplemental enhancement information message having the payload type being equal to 0 or being equal to 1 or being equal to 130 or being equal to 203, the non-scalable-nested supplemental enhancement information message applies to all the output layer sets, when present, that consist of all layers in the current coded video sequence in the entire bitstream.

In an embodiment, if the video data stream comprises at least one non-scalable nested supplemental enhancement information message for the hypothetical reference decoder, at least one of the plurality of output layer sets may, e.g., comprise all layers of the plurality of layers that are present in the video data stream.

According to an embodiment, all supplemental enhancement information message for the hypothetical reference decoder, which are not associated with an output layer set of the plurality of output layer sets which may, e.g., comprise all layers of the plurality of layers that are present in the video data stream, are scalable nesting supplemental enhancement information messages.

In an embodiment, all non-scalable nested supplemental enhancement information message for the hypothetical reference decoder are associated with an output layer set of the plurality of output layer sets which may, e.g., comprise all layers of the plurality of layers that are present in the video data stream.

Furthermore, according to an embodiment, a video encoder for encoding a video into a video data stream, such that the video data stream has the video encoded thereinto, is provided. The video encoder is to generate the video data stream such that the video data stream comprises a video parameter set. Moreover, the video encoder is to generate the video data stream such that the video parameter set comprises a plurality of output layer sets. If none of the plurality of output layer sets comprises all layers of a plurality of layers that are present in the video data stream, the video encoder is to generate the video data stream such that the video data stream does not comprise any non-scalable nested supplemental enhancement information message for a hypothetical reference decoder.

In an embodiment, if there may, e.g., be no output layer set that consists of all layers of the plurality of layers in a current coded video sequence of the video data stream, there may, e.g., be no non-scalable-nested supplemental enhancement information message with at least one of a buffering period payload and a picture timing payload and a decoding unit information payload.

According to an embodiment, if there may, e.g., be no output layer set that consists of all layers of the plurality of layers in the current coded video sequence of the video data stream, there may, e.g., be no non-scalable-nested supplemental enhancement information message with at least one of the buffering period payload and the picture timing payload and the decoding unit information payload and a subpicture level information payload.

In an embodiment, if there is no output layer set that consists of all layers of the plurality of layers in the current coded video sequence of the video data stream, there may, e.g., be no non-scalable-nested supplemental enhancement information message with a payload type being equal to a first value indicating the buffering period payload, or being equal to a second value indicating the picture timing payload, or being equal to a third value indicating the decoding unit information payload, or being equal to a fourth value indicating the subpicture level information payload.

According to an embodiment, for a non-scalable-nested supplemental enhancement information message having the payload type being equal to the first value, or being equal to the second value, or being equal to the third value, or being equal to the fourth value, the non-scalable-nested supplemental enhancement information message may, e.g., apply to all the output layer sets, when present, that consist of all layers in the current coded video sequence in the entire bitstream.

In an embodiment, if there is no output layer set that consists of all layers of the plurality of layers in the current coded video sequence of the video data stream, there is no non-scalable-nested supplemental enhancement information message with the payload type being equal to 0 indicating the buffering period payload, or being equal to 1 indicating the picture timing payload, or being equal to 130 indicating the decoding unit payload, or being equal to 203 indicating the subpicture level information payload.

According to an embodiment, for a non-scalable-nested supplemental enhancement information message having the payload type being equal to 0 or being equal to 1 or being equal to 130 or being equal to 203, the non-scalable-nested supplemental enhancement information message applies to all the output layer sets, when present, that consist of all layers in the current coded video sequence in the entire bitstream.

In an embodiment, if the video data stream may, e.g., comprise at least one non-scalable nested supplemental enhancement information message for the hypothetical reference decoder, the video encoder may, e.g., be configured to generate the video data stream such that at least one of the plurality of output layer sets may, e.g., comprise all layers of the plurality of layers that are present in the video data stream.

According to an embodiment, the video encoder may, e.g., be configured to generate the video data stream such that all supplemental enhancement information message for the hypothetical reference decoder, which are not associated with an output layer set of the plurality of output layer sets which may, e.g., comprise all layers of the plurality of layers that are present in the video data stream, are scalable nesting supplemental enhancement information messages.

In an embodiment, the video encoder may, e.g., be configured to generate the video data stream such that all non-scalable nested supplemental enhancement information message for the hypothetical reference decoder are associated with an output layer set of the plurality of output layer sets which may, e.g., comprise all layers of the plurality of layers that are present in the video data stream.

According to an embodiment, the apparatus may, e.g., be configured to decode the input bitstream to decode the video.

The current VVC draft specification provides means to carry HRD timing information (BP SEI message, PT SEI message, DUI SEI message) in the bitstream that apply only to a sub-bitstream, i.e. namely an OLS, in a nested form using scalable-nesting SEI messages that indicated the respective OLS. Other HRD SEI messages, carried directly in the bitstream (as non-scalable nested SEI messages) are required to apply to the 0-th OLS that is a single-layer sub-bitstream as indicated in the VPS through syntax element vps_layer_id [0]. However, as typical for layered coding, removal of this or any other layer from the bitstream does not require rewriting of VPS, and hence even the layer with nuh_layer_id equal to vps_layer_id [0] may not be present.

This requirement brings along the issue that when an OLS other than the 0-th OLS is extracted, no non-scalable nested SEI messages are allowed, even if the extracted OLS does include the layer with nuh_layer_id equal to vps_layer_id [0]. Only after rewriting the VPS (vps_layer_id [0]) and the respective value in NAL unit header of the respective layers can such non-scalable nested messages remain in the bitstream.

The following introduces two aspects of the invention that solve that issue as follows.

1) As a first solution, the complications described above are left untouched but the extraction process is adjusted in a way that it only removes the non-scalable nested SEI messages applying to the layer with nuh_layer_id equal to vps_layer_id [0] when the extracted OLS does not include the layer with nuh_layer_id equal to vps_layer_id [0]. Thereby the non-scalable nested SEI messages are not needlessly removed (or in other words, do not need to be replicated needlessly for each OLS that includes the layer with nuh_layer_id equal to vps_layer_id [0].
2) As a second solution, when there is no OLS defined in the VPS that corresponds to the complete bitstream (i.e. all layers therein), no non-scalable nested SEI messages (BP, PT, DUI) are allowed to be present within the bitstream. Otherwise, when there exists an OLS that corresponds to all present layers in a bitstream, the respective HRD SEI messages are allowed to be in the bitstream in a non-scalable nested fashion. All other HRD SEI messages (applying to another OLS) must be in scalable nesting SEI messages. Vice versa, all non-scalable nested SEI messages correspond to the present bitstream as a whole.

For a non-scalable-nested supplemental enhancement information message, when payloadType is equal to 0 (indicating buffering period, BP, content), 1 (indicating picture timing, PT, content), 130 (indicating decoding unit information, DUI, content), or 203 (indicating subpicture level information, SLI, content), the non-scalable-nested supplemental enhancement information message applies to all the output layer sets, when present, that consist of all layers in the current coded video sequence in the entire bitstream.

When there is no output layer set that consists of all layers in the current coded video sequence of the entire bitstream, there shall be no non-scalable-nested supplemental enhancement message with payloadType equal to 0 (BP), 1 (PT), 130 (DUI), or 203 (SLI).

In the following, rewrite sublayer PTL in DPS is described.

According to an embodiment, an apparatus for receiving a video data stream as an input bitstream, wherein video data stream has a video encoded thereinto, is provided. The video data stream comprises initial profile tier level information. Moreover, the video data stream comprises a first group of two or more layers. The apparatus is to process the input bitstream depending on an output layer set of a plurality of output layer sets to generate an output bitstream by removing at least one layer from the first group of two or more layers to obtain a second group of one or more layers, such that the output bitstream comprises the second group of one or more layers, but not the at least one layer that has been removed from the first group. Furthermore, the apparatus is to remove those portions of the initial profile tier level information from the initial profile tier level information that is not associated with at least one layer of the second group of one or more layers.

According to an embodiment, the video data stream may, e.g., comprise initial decoding parameter set profile tier level information as the initial profile tier level information. The apparatus may, e.g., be configured to remove those portions of the initial decoding parameter set profile tier level information from the initial decoding parameter set profile tier level information that is not associated with the at least one layer of the second group of one or more layers.

Furthermore, according to an embodiment, an apparatus for receiving a video data stream as an input bitstream, wherein video data stream has a video encoded thereinto, is provided.

The video data stream comprises scalable nesting supplemental enhancement information comprising decoding parameter set information for each output layer set of a plurality of output layer sets. The apparatus is to process the input bitstream depending on an output layer set of the plurality of output layer sets to obtain an output bitstream, such that the output bitstream comprises the decoding parameter set information for said output layer set, and such that the output bitstream does not comprise the decoding parameter set information for any other output layer set of the plurality of output layer sets.

In an embodiment, the video data stream may, e.g., comprise raw byte sequence payload. The raw byte sequence payload may, e.g., comprise the decoding parameter set information for each output layer set of the plurality of output layer sets.

According to an embodiment, the video data stream may, e.g., comprise a scalable nesting supplemental enhancement message which may, e.g., comprise the scalable nesting supplemental enhancement information that may, e.g., comprise the decoding parameter set information for each output layer set of the plurality of output layer sets.

In an embodiment, the video data stream may, e.g., comprise a nesting type flag (nesting_type) comprising one or more bits.

According to an embodiment, if the nesting type flag (nesting_type) exhibits a first value, this indicates that the scalable nesting supplemental enhancement message may, e.g., comprise one or more decoding parameter sets which comprise the decoding parameter set information, and that no further supplemental enhancement messages are nested within the scalable nesting supplemental enhancement message.

In an embodiment, if the nesting type flag (nesting_type) exhibits a second value, this indicates that one or more supplemental enhancement messages being nested within the scalable nesting supplemental enhancement message apply to an output layer set.

According to an embodiment, if the nesting type flag (nesting_type) exhibits a third value, this indicates that one or more supplemental enhancement messages being nested within the scalable nesting supplemental enhancement message apply to a subset of an output layer set.

In an embodiment, if the nesting type flag (nesting_type) exhibits a fourth value, this indicates the scalable nesting supplemental enhancement message may, e.g., comprise one or more decoding parameter sets which comprise the decoding parameter set information.

Moreover, according to an embodiment, a video data stream having a video encoded thereinto, is provided. The video data stream may, e.g., comprise scalable nesting supplemental enhancement information comprising decoding parameter set information for each output layer set of a plurality of output layer sets.

In an embodiment, the video data stream may, e.g., comprise raw byte sequence payload. The raw byte sequence payload may, e.g., comprise the decoding parameter set information for each output layer set of the plurality of output layer sets.

According to an embodiment, the video data stream may, e.g., comprise a scalable nesting supplemental enhancement message which may, e.g., comprise the scalable nesting supplemental enhancement information that may, e.g., comprise the decoding parameter set information for each output layer set of the plurality of output layer sets.

In an embodiment, the video data stream may, e.g., comprise a nesting type flag (nesting_type) comprising one or more bits.

According to an embodiment, if the nesting type flag (nesting_type) exhibits a first value, this indicates that the scalable nesting supplemental enhancement message may, e.g., comprise one or more decoding parameter sets which comprise the decoding parameter set information, and that no further supplemental enhancement messages are nested within the scalable nesting supplemental enhancement message.

In an embodiment, if the nesting type flag (nesting_type) exhibits a second value, this indicates that one or more supplemental enhancement messages being nested within the scalable nesting supplemental enhancement message apply to an output layer set.

According to an embodiment, if the nesting type flag (nesting_type) exhibits a third value, this indicates that one or more supplemental enhancement messages being nested within the scalable nesting supplemental enhancement message apply to a subset of an output layer set, e.g., wherein one or more subpictures are assigned to the subset.

In an embodiment, if the nesting type flag (nesting_type) exhibits a fourth value, this indicates the scalable nesting supplemental enhancement message may, e.g., comprise one or more decoding parameter sets which comprise the decoding parameter set information.

Furthermore, according to an embodiment, a video encoder for encoding a video into a video data stream, such that the video data stream has the video encoded thereinto, is provided. The video encoder is to generate the video data stream such that the video data stream comprises scalable nesting supplemental enhancement information comprising decoding parameter set information for each output layer set of a plurality of output layer sets.

In an embodiment, the video encoder may, e.g., be configured to generate the video data stream such that the video data stream may, e.g., comprise raw byte sequence payload. The video encoder may, e.g., be configured to generate the video data stream such that the raw byte sequence payload may, e.g., comprise the decoding parameter set information for each output layer set of the plurality of output layer sets.

According to an embodiment, the video encoder may, e.g., be configured to generate the video data stream such that the video data stream may, e.g., comprise a scalable nesting supplemental enhancement message which may, e.g., comprise the scalable nesting supplemental enhancement information that may, e.g., comprise the decoding parameter set information for each output layer set of the plurality of output layer sets.

In an embodiment, the video encoder may, e.g., be configured to generate the video data stream such that the video data stream may, e.g., comprise a nesting type flag (nesting_type) comprising one or more bits.

According to an embodiment, the video encoder may, e.g., be configured to generate the video data stream such that, if the nesting type flag (nesting_type) exhibits a first value, this indicates that the scalable nesting supplemental enhancement message may, e.g., comprise one or more decoding parameter sets which comprise the decoding parameter set information, and that no further supplemental enhancement messages are nested within the scalable nesting supplemental enhancement message.

In an embodiment, the video encoder may, e.g., be configured to generate the video data stream such that, if the nesting type flag (nesting_type) exhibits a second value, this indicates that one or more supplemental enhancement messages being nested within the scalable nesting supplemental enhancement message apply to an output layer set.

According to an embodiment, the video encoder may, e.g., be configured to generate the video data stream such that, if the nesting type flag (nesting_type) exhibits a third value, this indicates that one or more supplemental enhancement messages being nested within the scalable nesting supplemental enhancement message to a subset of an output layer set, e.g., wherein one or more subpictures are assigned to the subset.

In an embodiment, the video encoder may, e.g., be configured to generate the video data stream such that, if the nesting type flag (nesting_type) exhibits a fourth value, this indicates the scalable nesting supplemental enhancement message may, e.g., comprise one or more decoding parameter sets which comprise the decoding parameter set information.

Moreover, according to an embodiment, a video data stream having a video encoded thereinto, is provided. The video data stream comprises an indication of a plurality of operation points. Moreover, the video data stream comprises a first mapping for each operation point of the plurality of operation points which assigns one or more profile tier levels of a plurality of profile tier levels to said operation point. Furthermore, the video data stream comprises a plurality of second mappings, wherein each of the plurality of mappings assigns one of the plurality of operation points to an output level set of a plurality of output level sets.

In an embodiment, the video data stream may, e.g., comprise a decoding parameter set. The decoding parameter set may, e.g., comprise the indication of the plurality of operation points.

According to an embodiment, the video data stream may, e.g., comprise a number of layers indication indicating a number of layers of the video data stream; and/or the video data stream may, e.g., comprise a number of sublayers indication indicating a number of sublayers of the video data stream.

In an embodiment, a number of layers of the video data stream may, e.g., be constant; and/or a number of sublayers of the video data stream may, e.g., be constant.

According to an embodiment, the video data stream may, e.g., comprise scalable nesting supplemental enhancement information comprising decoding parameter set information for each output layer set of a plurality of output layer sets.

Furthermore, according to an embodiment, a video encoder for encoding a video into a video data stream, such that the video data stream has the video encoded thereinto, is provided. The video encoder is to generate the video data stream such that the video data stream comprises an indication of a plurality of operation points. Moreover, the video encoder is to generate the video data stream such that the video data stream comprises a first mapping for each operation point of the plurality of operation points which assigns one or more profile tier levels of a plurality of profile tier levels to said operation point. Furthermore, the video encoder is to generate the video data stream such that the video data stream comprises a plurality of second mappings, wherein each of the plurality of mappings assigns one of the plurality of operation points to an output level set of a plurality of output level sets.

In an embodiment, the video encoder may, e.g., be configured to generate the video data stream such that the video data stream may, e.g., comprise a decoding parameter set. The video encoder may, e.g., be configured to generate the video data stream such that the decoding parameter set may, e.g., comprise the indication of the plurality of operation points.

According to an embodiment, the video encoder may, e.g., be configured to generate the video data stream such that the video data stream may, e.g., comprise a number of layers indication indicating a number of layers of the video data stream; and/or the video encoder may, e.g., be configured to generate the video data stream such that the video data stream may, e.g., comprise a number of sublayers indication indicating a number of sublayers of the video data stream.

In an embodiment, the video encoder may, e.g., be configured to generate the video data stream such that a number of layers of the video data stream may, e.g., be constant; and/or the video encoder may, e.g., be configured to generate the video data stream such that a number of sublayers of the video data stream may, e.g., be constant.

According to an embodiment, the video encoder may, e.g., be configured to generate the video data stream such that the video data stream may, e.g., comprise scalable nesting supplemental enhancement information comprising decoding parameter set information for each output layer set of a plurality of output layer sets.

Moreover, according to an embodiment, an apparatus for receiving a video data stream as an input bitstream, wherein video data stream has a video encoded thereinto, is provided. The video data stream comprises an indication of a plurality of operation points. Furthermore, the video data stream comprises a first mapping for each operation point of the plurality of operation points which maps one or more profile tier levels of a plurality of profile tier levels to said operation point. Moreover, the video data stream comprises a plurality of second mappings, wherein each of the plurality of mappings maps one of the plurality of operation points to an output level set of a plurality of output level sets. The apparatus is to process the input bitstream depending on an output layer set of a plurality of output layer sets and depending on at least one of the second mappings, which maps one of the plurality of operation points said an output level set, to generate an output bitstream.

In an embodiment, the video data stream may, e.g., comprise a decoding parameter set. The decoding parameter set may, e.g., comprise the indication of the plurality of operation points. The apparatus is to process the decoding parameter set.

According to an embodiment, the video data stream may, e.g., comprise a number of layers indication indicating a number of layers of the video data stream; and/or the video data stream may, e.g., comprise a number of sublayers indication indicating a number of sublayers of the video data stream.

In an embodiment, a number of layers of the video data stream may, e.g., be constant; and/or a number of sublayers of the video data stream may, e.g., be constant.

According to an embodiment, the video data stream may, e.g., comprise scalable nesting supplemental enhancement information comprising decoding parameter set information for each output layer set of a plurality of output layer sets. The apparatus may, e.g., be configured to process the scalable nesting supplemental enhancement information.

According to an embodiment, the apparatus may, e.g., be configured to decode the input bitstream to decode the video.

Furthermore, according to an embodiment, a system for encoding a video into a video data stream and for decoding the video is provided. The system comprises a video encoder as described above and an apparatus as described above. The video encoder is to encode the video into the video data stream, such that the video data stream has the video encoded thereinto. The apparatus is to receive the video data stream as an input bitstream. Moreover, the apparatus is to decode the input bitstream to decode the video.

The VVC draft specification includes a Decoding Parameter Set (DPS) that describes constraints (PTL) of the bitstream. It is supposed to be used in capability exchange and negotiation such as SDP in RTSP/SIP or for stream selection in adaptive streaming scenarios. As such, its purpose is to indicate the maximum capabilities needed for a given bitstream (concatenation of CVSs)) and thereby its scope is larger as all parameter sets as defined in the respective predecessor codec generation (HEVC and AVC) that only had the scope of a coded video sequence (CVS). Now, the VVC draft specification describes constraints of a concatenation of CVSs, i.e. a bitstream. The DPS mainly carries a number of profile tier level information (PTL) that includes all PTLs used in the bitstream, i.e. all PTL in this list need to be supported in order to successfully decode the corresponding bitstream.

| | Descriptor |
|---|---|
| decoding_parameter_set_rbsp( ) { | |
| dps_decoding_parameter_set_id | u(4) |
| dps_max_sublayers_minus1 | u(3) |
| dps_reserved_zero_5bits | u(5) |
| dps_num_ptls_minus1 | u(4) |
| for( i = 0; i <= dps_num_ptls_minus1; i++ ) | |

-continued

| | Descriptor |
|---|---|
| profile_tier_level( 1, dps_max_sublayers_minus1 ) | |
| dps_extension_flag | u(1) |
| if( dps_extension_flag ) | |
| while( more_rbsp_data( ) ) | |
| dps_extension_data_flag | u(1) |
| rbsp_trailing_bits( ) | |
| } | |

An issue arises when bitstream extraction or pruning is carried out in which some layers are removed. After such processing, the resulting bitstream potentially does not carry the full set of layers anymore, e.g. a 3-layer containing version (respective OLS) is extracted from a 6-layer bitstream. Therefore, the DPS will not be able to serve its purpose of capability negotiation anymore in such cases as it does not accurately describe the PTL of the contents of the resulting bitstream after pruning.

Therefore, as part of the invention, the three options are described of how to mitigate the issue and enable using the DPS for capability negotiation.

In the following, DPS rewriting in extraction process is described.

The PTL information in the DPS is adjusted during extraction in that only PTL information that corresponds to remaining layers after extraction remains in the DPS while the other PTL information is removed.

In the following, sub-bitstream specific DPS nesting is described.

A scalable nesting SEI message is defined that carried an OLS specific DPS RBSP and extraction through the bitstream extraction process extracts the respective DPS RBSP and writes it into a new DPS in the output bitstream.

In an embodiment, a new nesting SEI message that carries parameter sets is used.

In another embodiment, a single scalable nesting SEI message is used to carry parameter sets, or other SEI messages. In this case, a syntax element is added to the scalable nesting SEI message to indicate what is carried out inside.

| | Descriptor |
|---|---|
| scalable_nesting( payloadSize ) { | |
| nesting_ols_flag | u(1) |
| nesting_type | u(2) |
| if( nesting_ols_flag ) { | |
| nesting_num_olss_minus1 | ue(v) |
| for( i = 0; i <= nesting_num_olss_minus1; i++ ) | |
| nesting_ols_idx_delta_minus1[ i ] | ue(v) |
| } else { | |
| nesting_all_layers_flag | u(1) |
| if( !nesting_all_layers_flag ) { | |
| nesting_num_layers_minus1 | ue(v) |
| for( i = 1; i <= nesting_num_layers_minus1; i++ ) | |
| nesting_layer_id[ i ] | u(6) |
| } | |
| } | |
| if( nesting_type == 0 ) | |
| nesting_num_seis_minus1 | ue(v) |
| if( nesting_type == 1 ) | |
| nesting_num_parameter_sets_minus1 | ue(v) |
| while( !byte_aligned( ) ) | |
| nesting_zero_bit /* equal to 0 */ | u(1) |
| for( i = 0; i <= nesting_num_seis_minus1; i++ ) | |
| sei_message( ) | |
| for( i = 0; i <= nesting_num_parameter_sets_minus1; i++ ) | |
| decoding_parameter_set( ) | |
| } | |

In the syntax above, it is assumed that when parameter sets are included (nesting_type==1), then there is no other SEIs. In another embodiment parameter sets and other SEIs can be both included into a nesting SEI message simultaneously.

In another embodiment, the nesting_type could be used for several purposes. Indicating that:

SEI messages nested within the nesting SEI apply to an OLS

SEI messages nested within the nesting SEI apply to a subset of an OLS, e.g. subpictures within an OLS There are parameter sets nested within the nesting SEI In the following, operation points in DPS are described.

DPS rewriting in extraction process and sub-bitstream specific DPS nesting might work under some circumstances, e.g. constrained bitstreams. For instance, DPS rewriting in extraction process. might work only if all VPSs of the bitstream are known beforehand and the number of layers/sub-layers do not change from CVS to CVS. In case of sub-bitstream specific DPS nesting something similar happens as in principle it could be possible that the OLSs (e.g. number of them and id-s) might change from CVS to CVS.

In a further embodiment Operation Points are defined. They might be defined in the DPS, and for each a list of PTLs is offered. An operation point index is added as an input to the decoding process in addition to the OLS index to describe and select the appropriate operation point. Then, some association of Operation Point to OLS is signalled in the VPS.

The syntax elements of the DPS would be changed as follows by removing the number of sub-layers as this might change from CVS to CVS and operation points are included.

| | Descriptor |
|---|---|
| decoding_parameter_set_rbsp( ) { | |
| dps_decoding_parameter_set_id | u(4) |
| dps_max_ ~~sublayers~~operation_points_minus1 | u(3) |
| dps_reserved_zero_5bits | u(5) |
| dps_num_ptls_minus1 | u(4) |
| for( j = 0; j <= dps_max_operation_points_minus1; j++ ) | |
| { | |
| for( i = 0; i <= dps_num_ptls_minus1; i++ ) | |
| profile_tier_level( 1, dps_max_sublayers_minus1 ) | |
| } | |
| dps_extension_flag | u(1) |
| if( dps_extension_flag ) | |
| while( more_rbsp_data( ) ) | |
| dps_extension_data_flag | u(1) |
| rbsp_trailing_bits( ) | |
| } | |

In a further embodiment, num_sub_layers and the number of layers is kept constant in the bitstream. Indication of that is added to the bitstream and a mapping between operation points and sub-layer or layers is indicated.

In another embodiment the scalable nesting SEI messages defined in 4.2. apply to an operation point and the mapping to OLS is provided as well in the bitstream.

In the following, MaxSubLayers in Param sets are described.

According to an embodiment, a video data stream having a video encoded thereinto, is provided. The video data stream comprises a sequence parameter set and a decoding parameter set. The sequence parameter set comprises a first indication value that indicates, according to the information stored in the sequence parameter set, a maximum number of sublayers or the maximum number of sublayers minus a constant value. The decoding parameter set comprises a second indication value that indicates, according to the information stored in the decoding parameter set, the maximum number of sublayers or the maximum number of sublayers minus the constant value. The first indication value is smaller than or equal to the second indication value.

In an embodiment, the video data stream may, e.g., comprise a sequence parameter set and a decoding parameter set. The sequence parameter set may, e.g., comprise a first indication value that indicates, according to the information stored in the sequence parameter set, a maximum number of sublayers or the maximum number of sublayers minus a constant value. The decoding parameter set may, e.g., comprise a second indication value that indicates, according to the information stored in the decoding parameter set, the maximum number of sublayers or the maximum number of sublayers minus the constant value. The second indication value of the decoding parameter set is an upper bound having precedence over the first indication value of the sequence parameter set.

According to an embodiment, the constant value may, e.g., be 1.

Moreover, according to an embodiment, a video encoder for encoding a video into a video data stream, such that the video data stream has the video encoded thereinto, is provided. The video encoder is to generate the video data stream such that the video data stream comprises a sequence parameter set and a decoding parameter set. The video encoder is to generate the video data stream such that the sequence parameter set comprises a first indication value that indicates, according to the information stored in the sequence parameter set, a maximum number of sublayers or the maximum number of sublayers minus a constant value. Moreover, the video encoder is to generate the video data stream such that the decoding parameter set comprises a second indication value that indicates, according to the information stored in the decoding parameter set, the maximum number of sublayers or the maximum number of sublayers minus the constant value. Furthermore, the video encoder is to generate the video data stream such that the first indication value is smaller than or equal to the second indication value.

Furthermore, according to an embodiment, a video encoder for encoding a video into a video data stream, such that the video data stream has the video encoded thereinto, is provided. The video encoder is to generate the video data stream such that the video data stream comprises a sequence parameter set and a decoding parameter set. Moreover, the video encoder is to generate the video data stream such that the sequence parameter set comprises a first indication value that indicates, according to the information stored in the sequence parameter set, a maximum number of sublayers or the maximum number of sublayers minus a constant value. Furthermore, the video encoder is to generate the video data stream such that the decoding parameter set comprises a second indication value that indicates, according to the information stored in the decoding parameter set, the maximum number of sublayers or the maximum number of sublayers minus the constant value. The second indication value of the decoding parameter set is an upper bound having precedence over the first indication value of the sequence parameter set.

In an embodiment, the constant value may, e.g., be 1. The video encoder may, e.g., be configured to generate the video data stream such that the sequence parameter set may, e.g., comprise the first indication value that indicates, according to the information stored in the sequence parameter set, the maximum number of sublayers or the maximum number of sublayers minus 1. The video encoder may, e.g., be configured to generate the video data stream such that the decoding parameter set may, e.g., comprise the second indication value that indicates, according to the information stored in the decoding parameter set, the maximum number of sublayers or the maximum number of sublayers minus 1.

Furthermore, according to an embodiment, an apparatus for receiving a video data stream as an input bitstream, wherein video data stream has a video encoded thereinto, is provided. The video data stream comprises a sequence parameter set and a decoding parameter set. The sequence parameter set comprises a first indication value that indicates, according to the information stored in the sequence parameter set, a maximum number of sublayers or the maximum number of sublayers minus a constant value. The decoding parameter set comprises a second indication value that indicates, according to the information stored in the decoding parameter set, the maximum number of sublayers or the maximum number of sublayers minus the constant value. If the first indication value is greater than the second indication value, the apparatus is to process the input bitstream to generate an output bitstream such that the output bitstream comprises the second indication value as an indication on a maximum number of sublayers or on a maximum number of sublayers minus the constant value.

In an embodiment, the constant value may, e.g., be 1. The sequence parameter set may, e.g., comprise the first indication value that indicates, according to the information stored in the sequence parameter set, the maximum number of sublayers or the maximum number of sublayers minus 1. The decoding parameter set may, e.g., comprise the second indication value that indicates, according to the information stored in the decoding parameter set, the maximum number of sublayers or the maximum number of sublayers minus 1. If the first indication value may, e.g., be greater than the second indication value, the apparatus may, e.g., be configured to process the input bitstream to generate an output bitstream such that the output bitstream may, e.g., comprise the second indication value as an indication on a maximum number of sublayers minus 1.

When bitstream pruning, also referred to sub-layer extraction, is carried out and NAL units belonging to certain Temporal IDs are dropped from a bitstream, usually parameter sets are not modified, although some high-level parameter set, such as DPS could be rewritten.

This leads to inconsistencies within the bitstream that make the decoding process unclear or more complex. For instance, if the DPS is rewritten as described in the previous section and the actual number of sublayers is indicated as dps_max_sublayers_minus1 (excluding the dropped Temporal IDs) but the values at the SPS are not modified (which is not envisioned) sps_max_sublayers_minus1 would have a higher value than the one on the DPS. A decoder would not really know what value should be trusted.

In one embodiment, it is a bitstream constraint that sps_max_sublayers_minus1 must be <=dps_max_sublayers_minus1. Thus, some kind of error resilience could be built if such an "issue" is encountered. With such a constraint, it would be clear that when parsing a "bitstream" violating this condition, the SPS having a higher value would correspond simply to a new bitstream (e.g., not discovered because of the loss of a end of bitstream (EOB) NAL unit). This would mean that when bitstream pruning is carried out dps_max_sublayers_minus1 cannot be changed unless sps_max_sublayers_minus1 is also changed.

In another embodiment, the constraint is not required and the DPS signalling is used to set the operation point or output layer set of the bitstream send to the decoder. That is, the when dps_max_sublayers_minus1 is smaller than sps_max_sublayers_minus1, the value signalled in the DPS takes precedence over the one in the SPS indicating that the bitstream send to the decoder has up to dps_max_sublayers_minus1.

Since the number of sub-layers might be different for different layers when more than one layer is present, the dps_max_sublayers_minus1 applies to all the output layers and all non-output layers have either dps_max_sublayers_minus1 or their corresponding sps_max_sublayers_minus1, if the latter is smaller than the dps_max_sublayers_minus1.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[1] ISO/IEC, ITU-T. High efficiency video coding. ITU-T Recommendation H.265 ISO/IEC 23008 10 (HEVC), edition 1, 2013; edition 2, 2014.

The invention claimed is:

1. A video decoder configured to:

decode, from a video data stream, a plurality of access units, the plurality of access units comprising:
- a first access unit, and
- a second access unit;

decode, from the video data stream, a delay_for_concatenation_ensured_flag corresponding to the first access unit; and in response to the delay_for_concatenation_ensured_flag having a value of 1, determine that the first access unit is at a position in the video data stream where splicing will be seamless with the second access unit when the second access unit has a buffering period supplemental enhancement information (BP SEI) message with:
a concatenation_flag equal to 1, and
a selected InitCpbRemovalDelay less than or equal to the value of max_initial_removal_delay_for_concatenation.

2. The video decoder of claim 1, wherein seamless splicing indicates that a Coded Picture Buffer (CPB) removal time distance between the first access unit associated with the delay_for_concatenation_ensured_flag having the value of 1 and the second access unit is the same as consecutive access units in the first access unit.

3. The video decoder of claim 1, further configured to:
decode, from the video data stream, a BP SEI message that designates a temporal sublayer,
wherein decoding the delay_for_concatenation_ensured_flag is only performed for access units associated with the temporal sublayer.

4. The video decoder of claim 1, further configured to:
decode, from the video data stream, a BP SEI message that designates the first access unit,
wherein decoding the delay_for_concatenation_ensured_flag is only performed for the first access unit.

5. The video decoder of claim 4, wherein:
the BP SEI message that designates the first access unit includes a signaled divisor, and
a first subset of access units includes all access units that:
include a cpb_removal_delay_minus1 that, when divided by the signaled divisor, has a remainder of zero, or
include a dpb_output_delay that, when divided by the signaled divisor, has a remainder of zero.

6. The video decoder of claim 4, wherein:
the BP SEI message that designates the first access unit includes a signaled divisor and a signaled remainder, and
a first subset of access units includes all access units that:
include a cpb_removal_delay_minus1 that, when divided by the signaled divisor, has a remainder that is equal to the signaled remainder, or
include a dpb_output_delay that, when divided by the signaled divisor, has a remainder that is equal to the signaled remainder.

7. A method for video decoding, the method comprising:
decoding, from a video data stream, a plurality of access units, the plurality of access units comprising:
a first access unit, and
a second access unit;
decoding, from the video data stream, a delay_for_concatenation_ensured_flag corresponding to the first access unit; and
in response to the delay_for_concatenation_ensured_flag having a value of 1, determining that the first access unit is at a position in the video data stream where splicing will be seamless with the second access unit when the second access unit has a buffering period supplemental enhancement information (BP SEI) message with:
a concatenation_flag equal to 1, and
a selected InitCpbRemovalDelay less than or equal to the value of max_initial_removal_delay_for_concatenation.

8. The method of claim 7, wherein seamless splicing indicates that a Coded Picture Buffer (CPB) removal time distance between the first access unit associated with the delay_for_concatenation_ensured_flag having the value of 1 and the second access unit is the same as consecutive access units in the first access unit.

9. The method of claim 7, further comprising:
decoding, from the video data stream, a BP SEI message that designates a temporal sublayer,
wherein decoding the delay_for_concatenation_ensured_flag is only performed for access units associated with the temporal sublayer.

10. The method of claim 7, further comprising:
decoding, from the video data stream, a BP SEI message that designates the first access unit,
wherein decoding the delay_for_concatenation_ensured_flag is only performed for the first access unit.

11. The method of claim 10, wherein:
the BP SEI message that designates the first access unit includes a signaled divisor, and
a first subset of access units includes all access units that:
include a cpb_removal_delay_minus1 that, when divided by the signaled divisor, has a remainder of zero, or
include a dpb_output_delay that, when divided by the signaled divisor, has a remainder of zero.

12. The method of claim 10, wherein:
the BP SEI message that designates the first access unit includes a signaled divisor and a signaled remainder, and
a first subset of access units includes all access units that:
include a cpb_removal_delay_minus1 that, when divided by the signaled divisor, has a remainder that is equal to the signaled remainder, or
include a dpb_output_delay that, when divided by the signaled divisor, has a remainder that is equal to the signaled remainder.

13. A non-transitory computer readable medium embodying a computer program, the computer program comprising computer readable program code that when executed by a decoder causes the decoder to:
decode, from a video data stream, a plurality of access units, the plurality of access units comprising:
a first access unit, and
a second access unit;
decode, from the video data stream, a delay_for_concatenation_ensured_flag corresponding to the first access unit; and
in response to the delay_for_concatenation_ensured_flag having a value of 1, determine that the first access unit is at a position in the video data stream where splicing will be seamless with the second access unit when the second access unit has a buffering period supplemental enhancement information (BP SEI) message with:
a concatenation_flag equal to 1, and
a selected InitCpbRemovalDelay less than or equal to the value of max_initial_removal_delay_for_concatenation.

14. The non-transitory computer readable medium of claim 13, wherein seamless splicing indicates that a Coded Picture Buffer (CPB) removal time distance between the first access unit associated with the delay_for_concatenation_ensured_flag having the value of 1 and the second access unit is the same as consecutive access units in the first access unit.

15. The non-transitory computer readable medium of claim 13, wherein the computer readable program code further causes the decoder to:
decode, from the video data stream, a BP SEI message that designates a temporal sublayer, wherein decoding the delay_for_concatenation_ensured_flag is only performed for access units associated with the temporal sublayer.

16. The non-transitory computer readable medium of claim 13, wherein the computer readable program code further causes the decoder to:

decode, from the video data stream, a BP SEI message that designates the first access unit, wherein decoding the delay_for_concatenation_ensured_flag is only performed for the first access unit.

17. The non-transitory computer readable medium of claim 16, wherein:

the BP SEI message that designates the first access unit includes a signaled divisor, and a first subset of access units includes all access units that:

include a cpb_removal_delay_minus1 that, when divided by the signaled divisor, has a remainder of zero, or include a dpb_output_delay that, when divided by the signaled divisor, has a remainder of zero.

18. The non-transitory computer readable medium of claim 16, wherein:

the BP SEI message that designates the first access unit includes a signaled divisor and a signaled remainder, and a first subset of access units includes all access units that:

include a cpb_removal_delay_minus1 that, when divided by the signaled divisor, has a remainder that is equal to the signaled remainder, or include a dpb_output_delay that, when divided by the signaled divisor, has a remainder that is equal to the signaled remainder.

19. A video encoder configured to:

encode, into a video data stream, a plurality of access units, the plurality of access units comprising:

a first access unit, and a second access unit;

encode, into the video data stream, a delay_for_concatenation_ensured_flag corresponding to the first access unit; and in response to the delay_for_concatenation_ensured_flag having a value of 1, determine that the first access unit is at a position in the video data stream where splicing will be seamless with the second access unit when the second access unit has a buffering period supplemental enhancement information (BP SEI) message with:

a concatenation_flag equal to 1, and a selected InitCpbRemovalDelay less than or equal to the value of max_initial_removal_delay_for_concatenation.

20. The video encoder of claim 19, wherein seamless splicing indicates that a Coded Picture Buffer (CPB) removal time distance between the first access unit associated with the delay_for_concatenation_ensured_flag having the value of 1 and the second access unit is the same as consecutive access units in the first access unit.

21. The video encoder of claim 19, further configured to:

encode, into the video data stream, a BP SEI message that designates a temporal sublayer, wherein encoding the delay_for_concatenation_ensured_flag is only performed for access units associated with the temporal sublayer.

22. The video encoder of claim 19, further configured to:

encode, into the video data stream, a BP SEI message that designates the first access unit, wherein encoding the delay_for_concatenation_ensured_flag is only performed for the first access unit.

23. The video encoder of claim 22, wherein:

the BP SEI message that designates the first access unit includes a signaled divisor, and a first subset of access units includes all access units that:

include a cpb_removal_delay_minus1 that, when divided by the signaled divisor, has a remainder of zero, or include a dpb_output_delay that, when divided by the signaled divisor, has a remainder of zero.

24. The video encoder of claim 22, wherein:

the BP SEI message that designates the first access unit includes a signaled divisor and a signaled remainder, and a first subset of access units includes all access units that:

include a cpb_removal_delay_minus1 that, when divided by the signaled divisor, has a remainder that is equal to the signaled remainder, or include a dpb_output_delay that, when divided by the signaled divisor, has a remainder that is equal to the signaled remainder.

25. A method of encoding a video, the method comprising:

encoding, into a video data stream, a plurality of access units, the plurality of access units comprising:

a first access unit, and a second access unit;

encoding, into the video data stream, a delay_for_concatenation_ensured_flag corresponding to the first access unit; and in response to the delay_for_concatenation_ensured_flag having a value of 1, determining that the first access unit is at a position in the video data stream where splicing will be seamless with the second access unit when the second access unit has a buffering period supplemental enhancement information (BP SEI) message with:

a concatenation_flag equal to 1, and a selected InitCpbRemovalDelay less than or equal to the value of max_initial_removal_delay_for_concatenation.

26. A non-transitory computer readable medium embodying a computer program, the computer program comprising computer readable program code that when executed by an encoder causes the encoder to:

encode, into a video data stream, a plurality of access units, the plurality of access units comprising:

a first access unit, and a second access unit;

encode, into the video data stream, a delay_for_concatenation_ensured_flag corresponding to the first access unit; and in response to the delay_for_concatenation_ensured_flag having a value of 1, determine that the first access unit is at a position in the video data stream where splicing will be seamless with the second access unit when the second access unit has a buffering period supplemental enhancement information (BP SEI) message with:

a concatenation_flag equal to 1, and a selected InitCpbRemovalDelay less than or equal to the value of max_initial_removal_delay_for_concatenation.

* * * * *